(12) United States Patent
Ghasemzadeh et al.

(10) Patent No.: US 10,985,856 B2
(45) Date of Patent: Apr. 20, 2021

(54) MULTIPLE NUMEROLOGIES IN A WIRELESS COMMUNICATION SYSTEM

(71) Applicant: Telefonaktiebolaget LM Ericsson (publ), Stockholm (SE)

(72) Inventors: Farshid Ghasemzadeh, Sollentuna (SE); Thomas Chapman, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 129 days.

(21) Appl. No.: 16/328,786

(22) PCT Filed: Feb. 2, 2018

(86) PCT No.: PCT/EP2018/052697
§ 371 (c)(1),
(2) Date: Feb. 27, 2019

(87) PCT Pub. No.: WO2018/141924
PCT Pub. Date: Aug. 9, 2018

(65) Prior Publication Data
US 2019/0207697 A1 Jul. 4, 2019

Related U.S. Application Data

(60) Provisional application No. 62/454,356, filed on Feb. 3, 2017.

(51) Int. Cl.
*H04W 4/00* (2018.01)
*H04J 11/00* (2006.01)
(Continued)

(52) U.S. Cl.
CPC .......... *H04J 11/003* (2013.01); *H04B 7/0617* (2013.01); *H04B 17/336* (2015.01);
(Continued)

(58) Field of Classification Search
None
See application file for complete search history.

(56) References Cited

U.S. PATENT DOCUMENTS

2008/0117833 A1* 5/2008 Borran ................ H04W 72/082
370/252
2016/0294498 A1* 10/2016 Ma .......................... H04L 5/001
(Continued)

OTHER PUBLICATIONS

International Search Report for International application No. PCT/EP2018/052697—dated Apr. 30, 2018.
(Continued)

*Primary Examiner* — Elisabeth Benoit Magloire
(74) *Attorney, Agent, or Firm* — Baker Botts, LLP

(57) ABSTRACT

Some embodiments include a method in a wireless transmitter for transmitting a first wireless signal according to a first numerology in a network capable of supporting two numerologies. The method comprises obtaining one or more requirements associated with each numerology; adapting at least one of a first filter property of the wireless transmitter, a first beamforming property of the wireless transmitter, and a guard band size between the first and second numerology based on the obtained one or more requirements; and transmitting the first wireless signal according to the first numerology. Particular embodiments may adapt one of a second filter property and/or a second beamforming property of the wireless transmitter, and transmit/receive a second wireless signal according to the second numerology. Further embodiments include a method in a wireless receiver corresponding to the embodiments in the wireless transmitter.

26 Claims, 21 Drawing Sheets

(51) Int. Cl.
    *H04L 27/26*     (2006.01)
    *H04B 17/336*    (2015.01)
    *H04B 7/06*      (2006.01)
    *H04L 5/00*      (2006.01)
    *H04W 72/08*     (2009.01)

(52) U.S. Cl.
    CPC .......... *H04L 5/001* (2013.01); *H04L 27/2602* (2013.01); *H04L 27/2605* (2013.01); *H04L 27/2607* (2013.01); *H04W 72/082* (2013.01)

(56) References Cited

U.S. PATENT DOCUMENTS

2017/0374664 A1* 12/2017 Kimura ............... H04L 27/2602
2018/0035458 A1*  2/2018 Islam ................... H04L 5/0096
2018/0198649 A1*  7/2018 Lindoff ................ H04L 5/0087
2018/0270093 A1*  9/2018 Lopez .................. H04L 5/0028

OTHER PUBLICATIONS

On Regular Resource Grid for Filtered OFDM by Petra Weitkemper et al.; IEEE Communications Letters, vol. 20, No, 12—Dec. 2016.
3GPP TSG-RAN WG4 #82; Athens, Greece; Source: Ericsson: Title: On multi-numerology transmission and requirements (R4-171158)—Feb. 13-17, 2017.
3GPP TSG-RAN WG4 #81; Reno, Nevada, USA; Source: Nokia, Alcatel-Lucent Shanghai Bell; Title: NR US in-band selectivity requirements at BS RX (R4-1609223)—Nov. 14-18, 2016.
3GPP TSG-RAN WG4 #81; Reno, Nevada, USA; Source: Nokia, Alcatel-Lucent Shanghai Bell; Title: NR DL in-band EVM and emission requirements at BS Tx (R4-1609225)—Nov. 14-18. 2016.
3GPP TSG RAN WG4 Meeting #81; Reno, USA; Source: Huawei, HiSilicon; Title: Considerations on different guard band for mixed numerologies (R4-1609412)—Nov. 14-18, 2016.
3GPP TSG-RAN WG4 NR AH; Source: Ericsson; Title: On multiplexing of numerologies (R4-1700217)—Jan. 17-19, 2017.

\* cited by examiner

MULTIPLE NUMEROLOGIES IN A WIRELESS COMMUNICATION SYSTEM

PRIORITY

This nonprovisional application is a U.S. National Stage Filing under 35 U.S.C. § 371 of International Patent Application Serial No. PCT/EP2018/052697 filed Feb. 2, 2018 and entitled "Multiple Numerologies in a Wireless Communication System" which claims priority to U.S. Provisional Patent Application No. 62/454,356 filed Feb. 3, 2017 both of which are hereby incorporated by reference in their entirety.

TECHNICAL FIELD

Particular embodiments are directed to wireless communications and, more particularly, to supporting multiple numerologies and mitigating wireless interference therein.

BACKGROUND

Third Generation Partnership Project (3GPP) includes specifications for a new radio access technology (NR) for fifth generation (5G) networks. NR enables a wider range of use cases than predecessor cellular radio technologies. For example, use cases include MBB (Mobile Broadband), Ultra Reliable Low Latency Communication (URLLC), MTC (Machine Type Communication), D2D (Device to device), V2V & V2X (Vehicle to Vehicle and Vehicle to infrastructure communication).

The NR air interface is based on orthogonal frequency division multiplexing (OFDM). When developing an OFDM waveform specification, two interrelated and key parameters are the subcarrier spacing in the frequency domain and the symbol length. For E-UTRA, the subcarrier spacing is fixed at 15 kHz and the symbol length (minus cyclic prefix) at 66.7 microseconds (μs). An example is illustrated in FIG. 1.

FIG. 1 is a block diagram illustrating long term evolution (LTE) subcarrier spacing and symbol duration. Sixteen subcarriers 10 are spaced 15 kHz apart in the frequency domain. Symbol 12 is 66.7 μs in the time domain plus a cyclic prefix.

Instead of the subcarrier spacing illustrated in FIG. 1, NR may include multiple possibilities for subcarrier spacing. The subcarrier spacing possibilities may be based on 15*2n kHz, where n may be 1, 2, 3 . . . or potentially 0.5 or 0.25.

Multiple subcarrier spacing has at least two benefits. First, NR may operate in a diverse range of spectrum, ranging from spectrum at less than 1 GHz up to several tens of GHz. The optimum subcarrier spacing depends upon phase noise experienced in the transmitter and receiver. The amount of phase noise depends on the frequency range. Thus, different subcarrier spacings are more optimal for different parts of the frequency range.

A second benefit of different subcarrier spacing is that the symbol length is directly related to the subcarrier spacing. The wider the subcarrier spacing, the shorter the symbol length. An example is illustrated in FIG. 2.

FIG. 2 is a block diagram illustrating three different example NR subcarrier spacings and symbol duration. In example (A), sixteen subcarriers 10a are spaced 15 kHz apart in the frequency domain. Symbol 12a is 66.7 μs in the time domain plus a cyclic prefix. Example (B) illustrates eight subcarriers 10b spaced 30 kHz apart in the frequency domain. Symbol 12b is 33.3 μs in the time domain plus a cyclic prefix. Example (C) illustrates four subcarriers 10c spaced 60 kHz apart in the frequency domain. Symbol 12c is 16.7 μs in the time domain plus a cyclic prefix.

For some applications, such as URLLC, latency is critical and thus a larger subcarrier spacing and the associated shorter subframe length are beneficial. For other applications, such as MBB, spectral efficiency is critical and the subcarrier spacing may be set to minimize phase noise and the overhead from the cyclic prefix (CP), which may lead to less wide subframe spacings than URLLC.

SUMMARY

The embodiments described herein include multiple requirements on error vector magnitude (EVM) and/or in-band emissions and/or receiver selectivity and the requirements may be set with different levels, each corresponding to different guard band sizes. The base station or user equipment (UE) may meet some or all of the requirements (potentially depending on the declared capability of the UE).

In particular embodiments, the base station and/or UE adapts its approach to setting the guard size, filtering, and beamforming to meet each of the requirements. By adapting to meet the individual requirements, the base station scheduler may adapt the approach to managing inter-numerology interference to match the operating conditions.

For example, a transmitter may adjust its filtering and beamforming properties for mitigating interference between two different numerologies according to an indicated strategy from an external source to the transmitter. The strategy may be indicated directly or may be implied from an allocated guard size. In some embodiments, the base station may signal to the UE to inform the UE which of the requirements it should meet for a particular transmission.

Particular embodiments may exhibit some of the following technical advantages. For example, particular embodiments facilitate base stations and UEs optimized according to deployment scenarios and strategies of different vendors. Particular embodiments facilitate managing inter-numerology interference dynamically depending on the priority, service type, usage scenario type, directions, and/or SINR conditions of the scheduled UEs. Other technical advantages will be readily apparent to one skilled in the art from the following figures, description and claims.

Some embodiments include a method in a wireless transmitter of transmitting a first wireless signal according to a first numerology in a wireless network capable of supporting both the first numerology and a second numerology. A numerology refers to a particular combination of subcarrier spacing and cyclic prefix length. The method comprises: obtaining one or more requirements associated with each numerology; adapting at least one of a first filter property of the wireless transmitter, a first beamforming property of the wireless transmitter, and a guard band size between the first numerology and the second numerology based on the obtained one or more requirements; and transmitting the first wireless signal according to the first numerology. An advantage is that the transmitter is able to optimize spectrum utilization and interference level between the transmissions when transmitting simultaneously with at least two numerologies. By providing simultaneous transmissions according to different numerologies, a more appropriate numerology may be selected for each transmission, depending on the service or application. Reducing the interference provides improved quality of service and optimizes throughput for transmissions using either numerology. In some examples, the one or more requirements comprise an indication corresponding to a level of interference between a transmission using the first numerology and a transmission using the second numerology. The method may further comprise: adapting at least one of a second filter property of the wireless transmitter and a second beamforming property of the wireless transmitter; and transmitting a second wireless signal according to the second numerology.

In particular embodiments, the one or more requirements comprise at least one of an indication that a number of unused subcarriers between the first numerology and the second numerology is above or below a threshold number of subcarriers, an indication that the interference level for the first numerology is above or below a threshold interference level, and an indication that the interference level for the second numerology is above or below the threshold interference level.

For example, the one or more requirements may comprise an indication that the number of unused subcarriers between the first numerology and the second numerology is below the threshold number of carriers, an indication that the first numerology and the second numerology are transmitted in the same direction, an indication that the interference level for the first numerology is below the threshold interference level, and an indication that the second numerology is below the threshold interference level.

As another example, the one or more requirements may comprise an indication that the number of unused subcarriers between the first numerology and the second numerology is below the threshold number of carriers, an indication that the first numerology and the second numerology are transmitted in the same direction, an indication that the interference level for the first numerology is below the threshold interference level, and an indication that the second numerology is above the threshold interference level.

In another example, the one or more requirements may comprise an indication that the number of unused subcarriers between the first numerology and the second numerology is above the threshold number of carriers, an indication that the first numerology and the second numerology are transmitted in the same direction, an indication that the interference level for the first numerology is below the threshold interference level, and an indication that the second numerology is below the threshold interference level.

In one example, the one or more requirements comprise an indication that the number of unused subcarriers between the first numerology and the second numerology is below the threshold number of carriers, an indication that the first numerology and the second numerology are transmitted in the same direction, an indication that the interference level for the first numerology is above the threshold interference level, and an indication that the second numerology is above the threshold interference level.

In particular embodiments, the interference level is an error vector magnitude (EVM) level and the threshold interference level refers to a threshold EVM level. In some embodiments, the interference level is an in-band emissions level and the threshold interference level refers to a threshold in-band emissions level. The one or more requirements may be based on a size of a guard band between the first numerology and the second numerology. Obtaining the one or more requirements may comprise receiving the one or more requirements from a scheduler or receiving a preconfiguration based on a specification in a standard, product requirement, or test result.

In particular embodiments, the wireless transmitter comprises one of a user equipment and a network node.

According to some embodiments, a wireless transmitter is capable of transmitting a first wireless signal according to a first numerology in a wireless network that supports both the first numerology and a second numerology. The wireless transmitter comprises processing circuitry operable to: obtain one or more requirements associated to each numerology; adapt at least one of a first filter property of the wireless transmitter, a first beamforming property of the wireless transmitter, and a guard band size between the first numerology and the second numerology based on the obtained one or more requirements; and transmit the first wireless signal according to the first numerology. In some examples the obtained one or more requirement comprises an indication of a level of interference between a transmission using the first numerology and a transmission using the second numerology. The processing circuitry may be further operable to: adapt at least one of a second filter property of the wireless transmitter and a second beamforming property of the wireless transmitter to meet the minimum acceptable interference level between the first numerology and the second numerology; and transmit a second wireless signal (130) according to the second numerology.

In particular embodiments, the one or more requirements comprise at least one of an indication that a number of unused subcarriers between the first numerology and the second numerology is above or below a threshold number of subcarriers, an indication that the interference level for the first numerology is above or below a threshold interference level, and an indication that the interference level for the second numerology is above or below the threshold interference level.

In particular embodiments, the processing circuitry is operable to obtain the one or more requirements by receiving the indication from a scheduler or by receiving a preconfiguration based on a specification in a standard, product requirement, or test result.

In particular embodiments, the wireless transmitter comprises one of a user equipment and a network node.

Some embodiments include a method in a wireless receiver of receiving a first wireless signal according to a first numerology in a wireless network capable of supporting both the first numerology and a second numerology. The method comprises: obtaining one or more requirements associated with each numerology; adapting at least one of a first filter property of the wireless receiver, a first beamforming property of the wireless receiver, and a guard band size between the first numerology and the second numerology based on the obtained one or more requirements; and receiving the first wireless signal according to the first numerology. An advantage is that the receiver is able to optimize interference level between the received at least two numerologies. By receiving simultaneous transmissions according to different numerologies, more appropriate numerologies may be used for each transmission, depending on the service or application. Reducing the interference provides improved quality of service and optimizes throughput for transmissions using either numerology. In some examples the one or more requirement comprises an indication of a level of interference between a transmission using the first numerology and a transmission using the second numerology. The method may further comprise: adapting at least one of a second filter property of the wireless receiver and a second beamforming property of the wireless receiver; and receiving a second wireless signal according to the second numerology.

In particular embodiments, the one or more requirements comprise at least one of an indication that a number of unused subcarriers between the first numerology and the second numerology is above or below a threshold number of subcarriers, an indication that the interference level for the first numerology is above or below a threshold interference level, and an indication that the interference level for the second numerology is above or below the threshold interference level.

For example, the one or more requirements may comprise an indication that the number of unused subcarriers between the first numerology and the second numerology is below the threshold number of carriers, an indication that the first numerology and the second numerology are received from the same direction, an indication that the interference level for the first numerology is below the threshold interference level, and an indication that the second numerology is below the threshold interference level.

As another example, the one or more requirements may comprise an indication that the number of unused subcarriers between the first numerology and the second numerology is below the threshold number of carriers, an indication that the first numerology and the second numerology are received from the same direction, an indication that the interference level for the first numerology is below the threshold interference level, and an indication that the second numerology is above the threshold interference level.

In one example, the one or more requirements may comprise an indication that the number of unused subcarriers between the first numerology and the second numerology is above the threshold number of carriers, an indication that the first numerology and the second numerology are received from the same direction, an indication that the interference level for the first numerology is below the threshold interference level, and an indication that the second numerology is below the threshold interference level.

In another example, the one or more requirements may comprise an indication that the number of unused subcarriers between the first numerology and the second numerology is below the threshold number of carriers, an indication that the first numerology and the second numerology are received from the same direction, an indication that the interference level for the first numerology is above the threshold interference level, and an indication that the second numerology is above the threshold interference level.

In particular embodiments, the interference level is an error vector magnitude (EVM) level and the threshold interference level refers to a threshold EVM level. In some embodiments, the interference level is a selectivity level and the threshold interference level refers to a threshold selectivity level. The indication of the minimum acceptable interference level may be based on a size of a guard band between the first numerology and the second numerology. Obtaining the one or more requirements may comprise receiving the one or more requirements from a scheduler, or receiving a preconfiguration based on a specification in a standard, product requirement, or test result.

In particular embodiments, the wireless receiver comprises one of a user equipment and a network node.

According to some embodiments, a wireless receiver is capable of receiving a first wireless signal according to a first numerology in a wireless network capable of supporting both the first numerology and a second numerology. The wireless receiver comprises processing circuitry operable to: obtain one or more requirements associated with each numerology; adapt at least one of a first filter property of the wireless receiver, a first beamforming property of the wireless receiver, and a guard band size between the first numerology and the second numerology based on the obtained one or more requirements; and receive the first wireless signal according to the first numerology. In some examples the one or more requirement comprises an indication of a level of interference between a transmission using the first numerology and a transmission using the second numerology. The processing circuitry may be further operable to: adapt at least one of a second filter property of the wireless receiver and a second beamforming property of the wireless receiver; and receive a second wireless signal according to the second numerology.

In particular embodiments, the one or more requirements comprise at least one of an indication that a number of unused subcarriers between the first numerology and the second numerology is above or below a threshold number of subcarriers, an indication that the interference level for the first numerology is above or below a threshold interference level, and an indication that the interference level for the second numerology is above or below the threshold interference level.

In particular embodiments, the interference level is an error vector magnitude (EVM) level and the threshold interference level refers to a threshold EVM level. In some embodiments, the interference level is a selectivity level and the threshold interference level refers to a threshold selectivity level. The indication of the minimum acceptable interference level may be based on a size of a guard band between the first numerology and the second numerology. The processing circuitry may be operable to obtain one or more requirements by receiving the one or more requirements from a scheduler, or by receiving a preconfiguration based on a specification in a standard, product requirement, or test result.

In particular embodiments, the wireless receiver comprises one of a user equipment and a network node (e.g., eNB, gNB).

According to some embodiments, a wireless transmitter is capable of transmitting a first wireless signal according to a first numerology in a wireless network that supports both the first numerology and a second numerology. The wireless transmitter comprises a requirement receiving module, an adapting module, and a transmitting module. The requirement receiving module is operable to obtain one or more requirements associated with each numerology. The adapting module is operable to adapt at least one of a first filter property of the wireless transmitter, a first beamforming property of the wireless transmitter, and a guard band size between the first numerology and the second numerology based on the obtained one or more requirements. The transmitting module is operable to transmit the first wireless signal according to the first numerology.

According to some embodiments, a wireless receiver is capable of receiving a first wireless signal according to a first numerology in a wireless network capable of supporting both the first numerology and a second numerology. The wireless receiver comprises a requirement receiving module, an adapting module, and a receiving module. The requirement receiving module is operable to obtain one or more requirements associated with each numerology. The adapting module is operable to adapt at least one of a first filter property of the wireless receiver, a first beamforming property of the wireless receiver, and a guard band size between the first numerology and the second numerology based on the obtained one or more requirements. The receiving module is operable to receive the first wireless signal according to the first numerology.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Third Generation Partnership Project (3GPP) includes specifications for a new radio access technology (NR) for fifth generation (5G) networks. Two interrelated parameters for NR include the subcarrier spacing in the frequency domain and the symbol length. For E-UTRA, the subcarrier spacing is fixed at 15 kHz and the symbol length (minus cyclic prefix) at 66.7 μsec. Multiple subcarrier spacing for NR has at least two benefits. First, NR may operate in a diverse range of spectrum, ranging from spectrum at less than 1 GHz up to several tens of GHz. The optimum subcarrier spacing depends upon phase noise experienced in the transmitter and receiver. The amount of phase noise depends on the frequency range. Thus, different subcarrier spacings are more optimal for different parts of the frequency range.

A second benefit of different subcarrier spacing is that the symbol length is directly related to the subcarrier spacing. The wider the subcarrier spacing, the shorter the symbol length.

For some applications latency is critical and thus a larger subcarrier spacing and the associated shorter subframe length are beneficial. For other applications spectral efficiency is critical and the subcarrier spacing may be set to minimize phase noise and the overhead from the cyclic prefix (CP), which may lead to less wide subframe spacings than for the latency critical applications.

NR may use wider subcarrier spacings for some types of physical channels (e.g., for transmission of broadcast and synchronization) compared to subcarrier spacing used for data. If a base station or user equipment (UE) are transmitting or receiving different types of service, it may be that different subcarrier spacings are appropriate for each service. To enable optimized multi-service transmission, 3GPP may include 5G specifications for the possibility of transmitting two different numerologies within the same frequency allocation for the base station, the UE, or both.

Transmitting two numerologies within the same frequency allocation, however, gives rise to some difficulties. For example, orthogonal frequency division multiplexing (OFDM) waveforms transmit unwanted sidelobes in the frequency domain outside of the allocated frequency band. If the OFDM transmission is exactly synchronized with another OFDM transmission with the same numerology on the other carrier, then the unwanted transmissions from one OFDM carrier go to zero at the frequencies of the subcarriers of the other transmission. For multiple numerologies, however, the different numerologies may interfere with one another.

Figure 1:
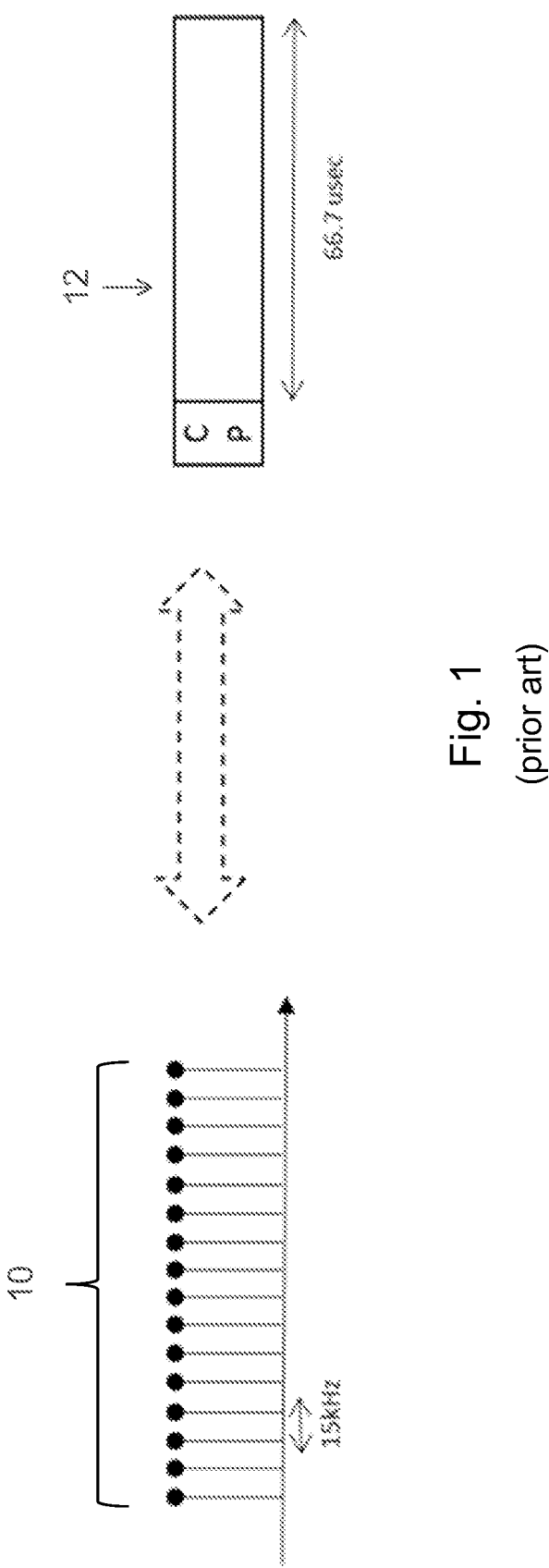
FIG. 1 is a block diagram illustrating long term evolution (LTE) subcarrier spacing and symbol duration.
Figure 2:
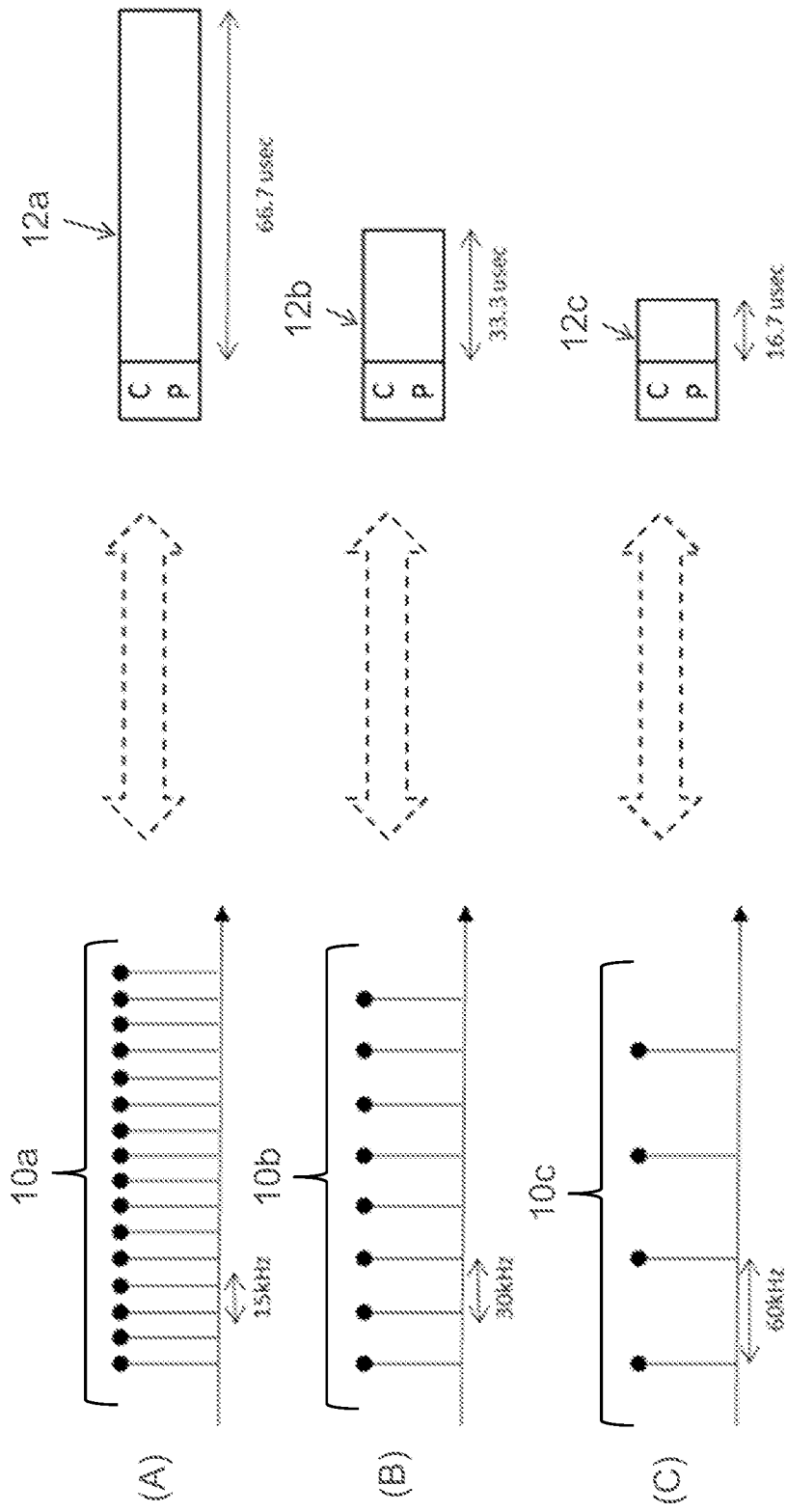
FIG. 2 is a block diagram illustrating three different example NR subcarrier spacings and symbol duration.
Figure 3:
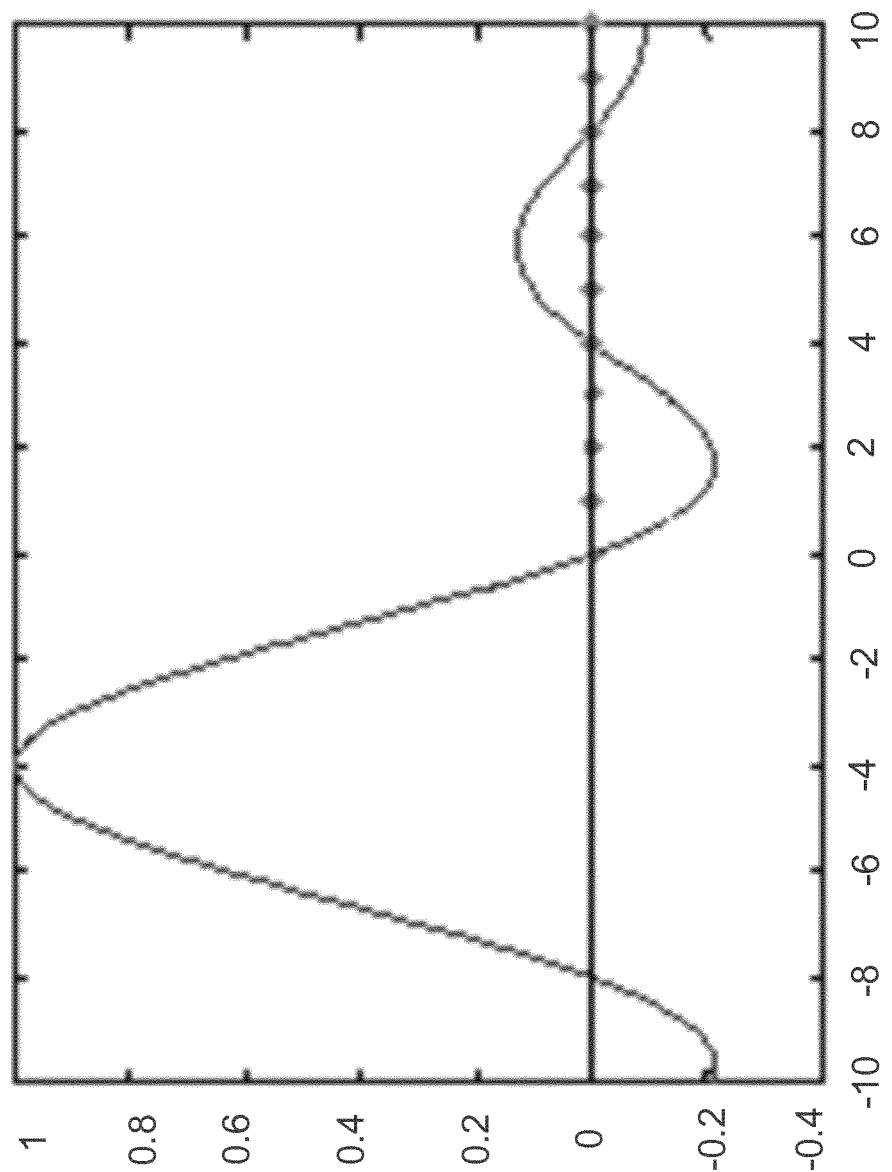
FIG. 3 is a graph illustrating example interference between different numerologies.

The numerology with the higher subcarrier spacing will not go to zero at all subcarriers of the numerology with a lower subcarrier spacing, as indicated in FIG. 3.

FIG. 3 is a graph illustrating example interference between different numerologies. The x-axis represents the frequency domain with diamonds at the particular subcarriers. The y-axis represents the wireless signal.

Another problem is that because the symbol duration and fast Fourier transform (FFT) rate of the carrier with higher spacing is different than the carrier with lower spacing, the lower spaced carrier may also interfere with the higher spaced carrier.

Figure 4:
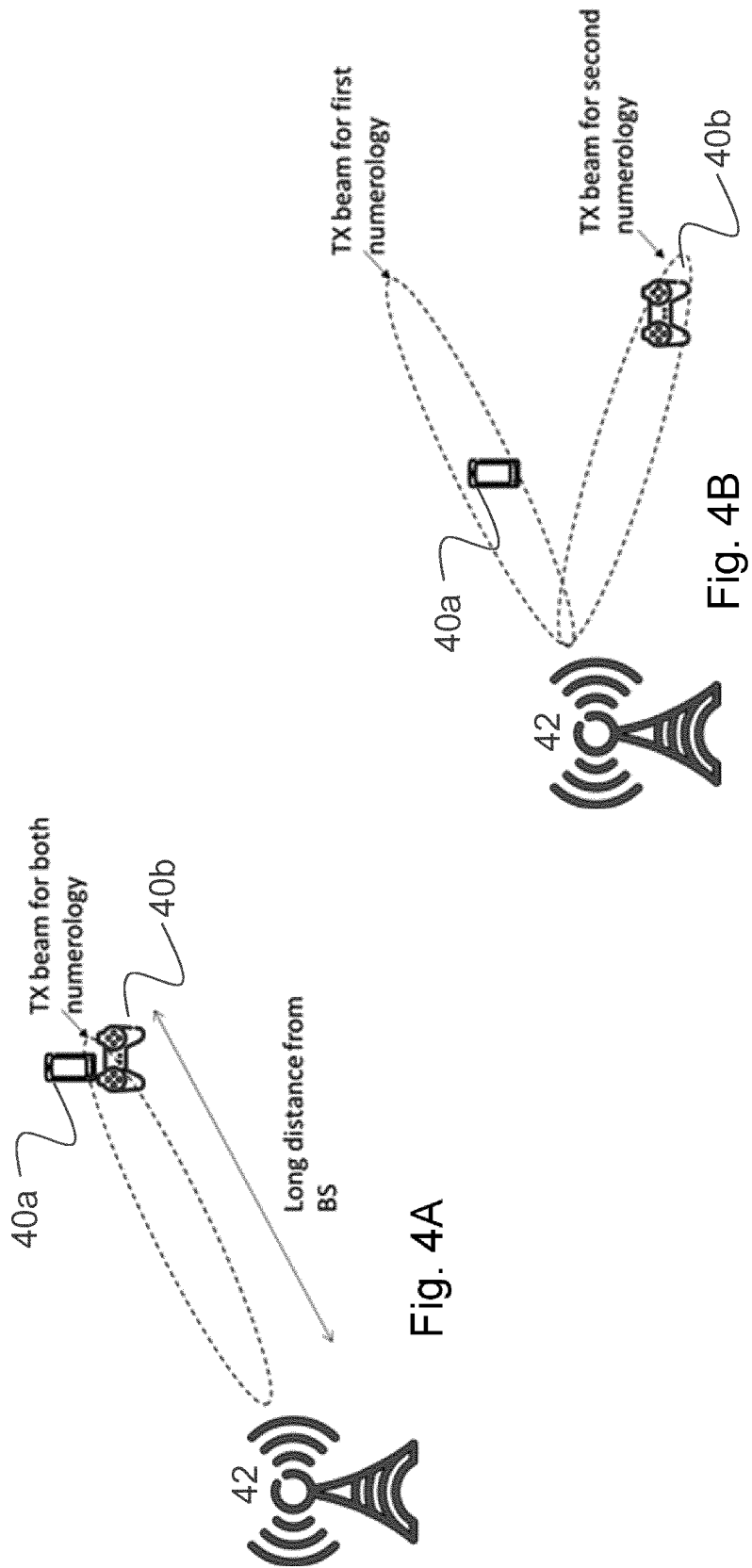
FIG. 4A illustrates an example multi-numerology network with receivers near the cell edge.
FIG. 4B illustrates an example multi-numerology network with receivers positioned at different beam directions.

Interference between numerologies may not always be a problem. For example, if UEs scheduled for downlink are at low signal to interference and noise ratio (SINR) (i.e., near a cell edge), then interference between numerologies may be insignificant compared to other sources of interference. An example is illustrated in FIG. 4A.

FIG. 4A illustrates an example multi-numerology network with receivers near the cell edge. Wireless devices 40a and 40b are both near the edge of the cell served by base station 42. Accordingly, interference between the two numerologies may be insignificant compared to other sources of interference, despite the UEs being positioned such that the beams are transmitted in the same direction.

As another example, if a base station performs beamforming and two UEs scheduled for downlink are in different directions, then spatial differentiation of the numerologies may mitigate interference between numerologies. An example is illustrated in FIG. 4B.

FIG. 4B illustrates an example multi-numerology network with receivers positioned such that the beams are transmitted with different beam directions. Wireless devices 40a and 4b are positioned in different directions from the transmitter, such that that the beams are transmitted in different directions. A transmit beam that base station 42 transmits to wireless device 40a may not interfere with a transmit beam that base station 42 transmits to wireless device 40b, and vice versa.

In these examples, the transmitter does not take any special action to account for inter-numerology interference. If the scheduled UEs are, however, in the same direction in relation to the transmitted, such that the beams are transmitted in the same direction, and have reasonably high SINR, then inter-numerology interference may degrade performance. An example is illustrated in FIG. 5.

Figure 5:
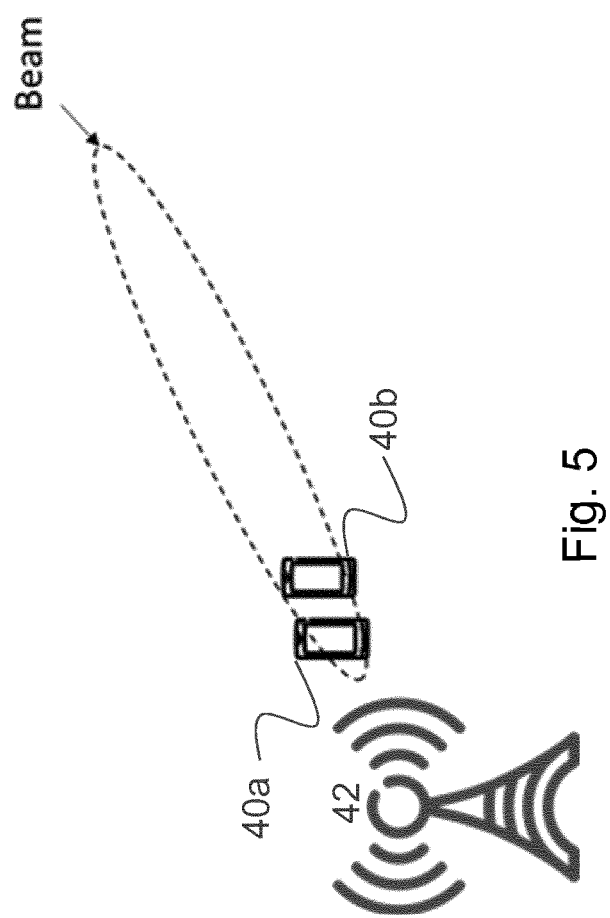
FIG. 5 illustrates an example multi-numerology network with receivers positioned near the transmitter and at a similar beam direction.

FIG. 5 illustrates an example multi-numerology network with receivers positioned near the transmitter and at a similar beam direction. Wireless devices 40a and 4b are positioned near each other and near base station 42. Accordingly, transmissions to different numerologies may interfere with each other.

As used herein with respect to beam direction, the terms "same direction" and "different direction" may be described in terms of a beam direction, a physical proximity between wireless devices, or any other suitable reference. Same direction refers to two numerologies transmitted in a same or substantially the same direction where inter-numerology interference is above a particular threshold. The threshold may vary for different network configurations. Different direction refers to two numerologies transmitted in different directions such that inter-numerology interference is below a particular threshold. The threshold may vary for different network configurations.

Figure 6:
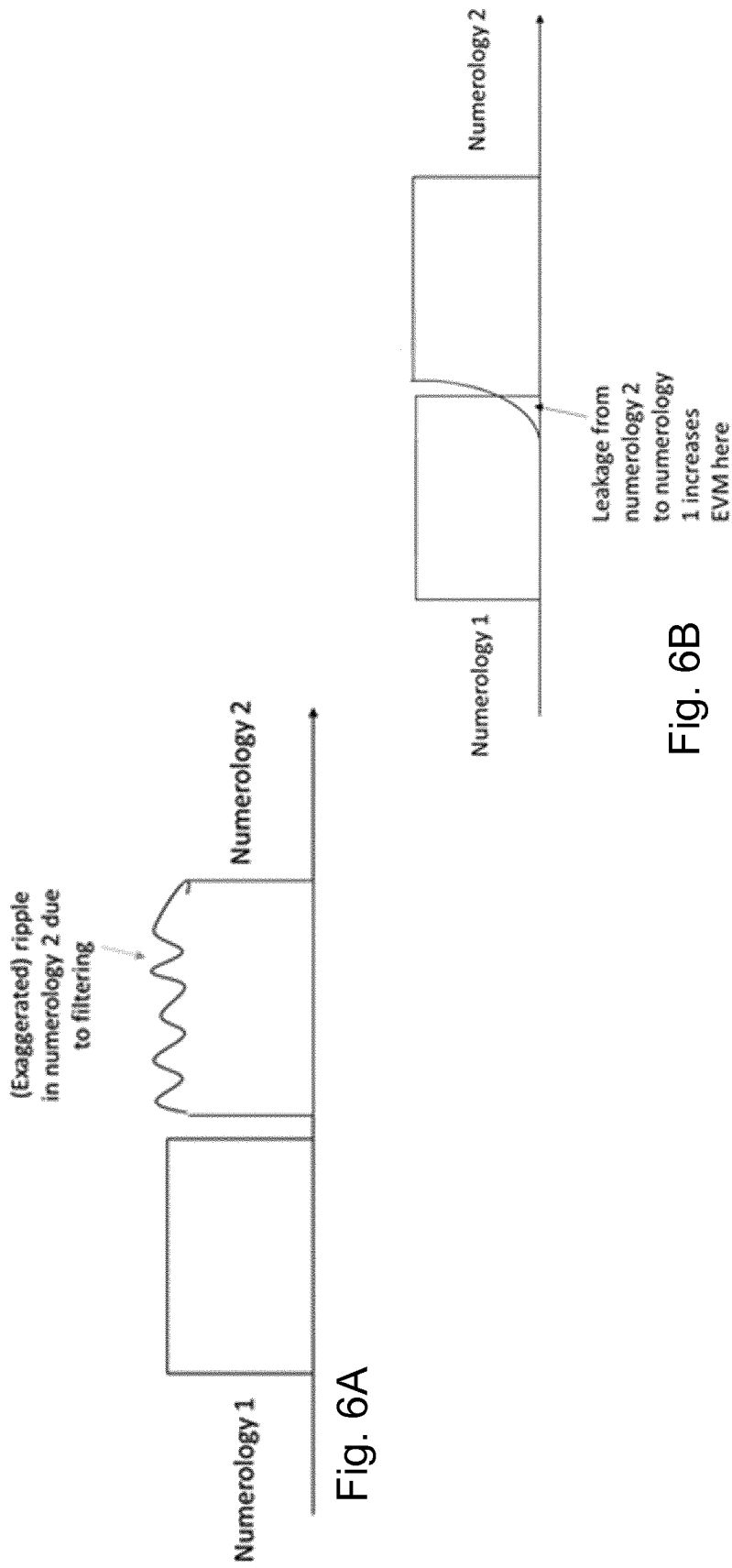
FIG. 6A illustrates an example of filter EVM causing self-interference.
FIG. 6B illustrates an example of leakage from one numerology to another.

A transmitter may reduce the impact of interference between the numerologies, for example, in at least three ways. In one example, the transmitter may apply a sharp filtering to each numerology to attenuate the interference into the other numerology. The sharp filtering, however, will cause self-interference in the passband to the numerology that would interfere. Thus, the impact to the interfered numerology is reduced at the cost of the interferer. An example is illustrated in FIG. 6A.

FIG. 6A illustrates an example of filter EVM causing self-interference. The horizontal axis represents the frequency domain. As illustrated, numerology 2 includes a ripple because of filtering.

As another example, the transmitter may not apply sharp filtering. Then the self-interference will not occur. However, interference from interferer to interfered numerology will increase.

FIG. 6B illustrates an example of leakage from one numerology to another. The horizontal axis represents the frequency domain. Leakage from numerology 2 to numerology 1 increases EVM at the illustrated arrow.

As a third example, the transmitter may avoid transmission for a certain guard spacing in frequency between the numerologies. This would reduce both the interference between the numerologies and self-interference because of filtering, but at a cost of slightly lower spectrum utilization.

Which example to implement may depend on the transmitter implementation, on the services carried on each numerology, and on the instantaneous conditions. To provide predictable performance, minimum requirements on transmitter and receiver parameters may be used when multiple numerologies are transmitted. The minimum requirements may consist of any of the following examples: (a) error vector magnitude (EVM) requirements on the transmitter, which capture both self-interference due to filtering and interference between numerologies; (b) in-band emissions requirements, which capture interference between numerologies; (c) receiver selectivity requirements, which are related to the ability of the receiver to receive on one numerology while avoiding energy from the other numerology; (d) receiver demodulation requirements, which are related to the amount of distortion incurred on a particular numerology; and (e) receiver EVM requirements, which are related to the amount of distortion incurred on a particular numerology.

Providing multiple or different requirements, however, may include problems. For example, traditional requirements on unwanted emissions, EVM, or selectivity involve a single requirement that is based on a specific test model. Setting the requirements for multiple numerologies in the traditional way may lead to one or more problems. If the requirement assumes a narrow guard band and sharp filtering, then it effectively mandates that filtering be used. If the requirement assumes a narrow guard band and significant inter-numerology interference, then it will limit performance at high SINR when both of the numerologies are in the same direction. If the requirement mandates a wide guard band, and if the base station scheduler decides to allocate a narrow guard band, performance of the base station and UE may not be guaranteed.

Particular embodiments obviate the problems described above and include multiple requirements on error vector magnitude (EVM) and/or in-band emissions and/or receiver selectivity, and the requirements may be set with different levels, each corresponding to different guard band sizes. The base station or user equipment (UE) may meet some or all of the requirements (potentially depending on the declared capability of the UE).

In particular embodiments, the base station and/or UE adapts its approach to setting the guard band size, filtering, and beamforming to meet each of the requirements. By adapting to meet the individual requirements, the base station scheduler may adapt the approach to managing inter-numerology interference to match the operating conditions. This provides the advantage that the transmitter is able to optimize interference level between the transmissions according to the two numerologies when transmitting simultaneously with at least two numerologies. By providing simultaneous transmissions according to different numerologies, more appropriate numerologies may be selected, depending on the service or application, and reducing the interference provides improved quality of service for transmissions using either numerology.

This also provides an advantage to the receiver, such that the receiver is able to receive at least two numerologies simultaneously with an optimized interference level between the transmissions received according to the two numerologies. By receiving transmissions on different numerologies, more appropriate numerologies may be used, depending on the service or application, and reducing the interference provides improved quality of service for transmissions using either numerology.

For example, a transmitter may adjust its filtering and beamforming properties for mitigating interference between two different numerologies according to an indicated strategy from an external source to the transmitter. The strategy may be indicated directly or may be implied, for example, from an allocated guard band size. In some embodiments, the base station may signal to the UE to inform the UE which of the requirements it should meet for a particular transmission.

Particular embodiments facilitate base stations and UEs optimized according to deployment scenarios and strategies of different vendors. Particular embodiments facilitate managing inter-numerology interference dynamically depending on the priority, service type, usage scenario type, directions, and/or SINR conditions of the scheduled UEs.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 7-21 of the drawings, like numerals being used for like and corresponding parts of the various drawings. LTE and NR are used throughout this disclosure as an example cellular system, but the ideas presented herein may apply to other wireless communication systems as well.

Figure 7:
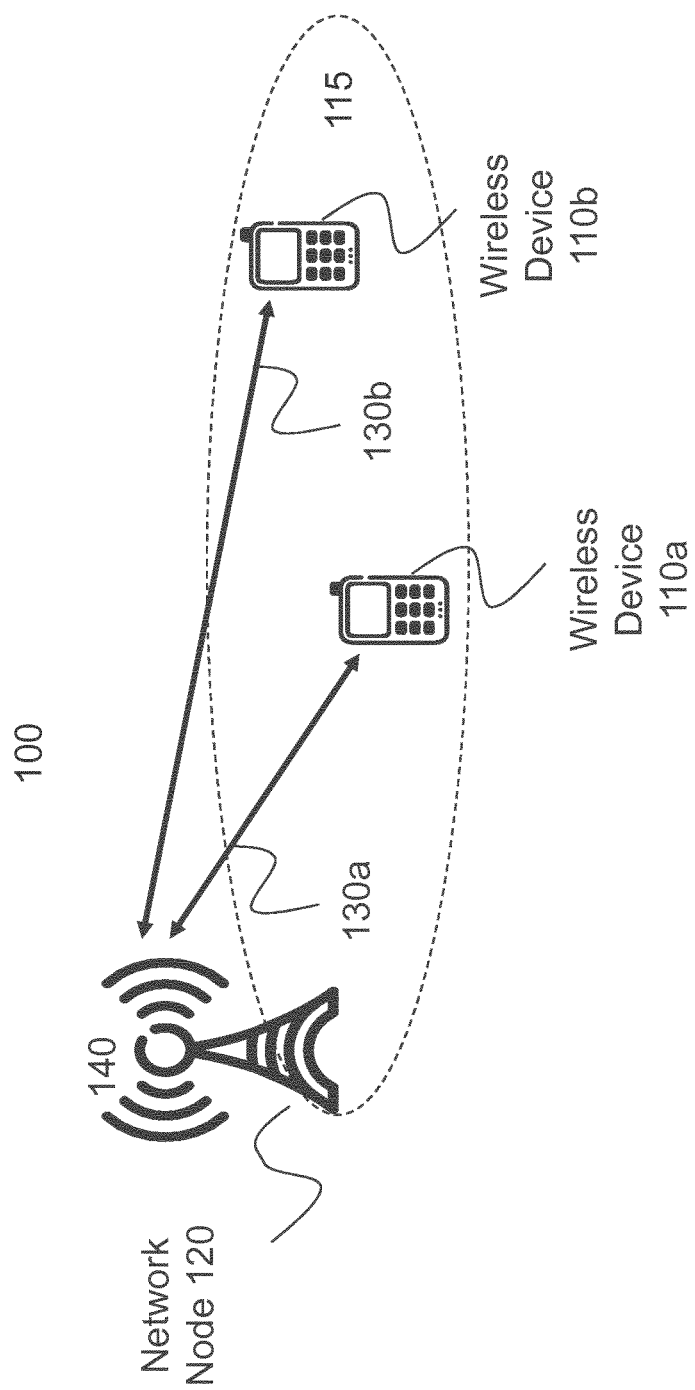
FIG. 7 is a block diagram illustrating an example wireless network, according to some embodiments.

FIG. 7 is a block diagram illustrating an example wireless network, according to a particular embodiment. Wireless network 100 includes one or more wireless devices 110 (such as mobile phones, smart phones, laptop computers, tablet computers, MTC devices, vehicular communication devices, or any other devices that can provide wireless communication) and a plurality of network nodes 120 (such as base stations, eNodeBs, gNBs, etc.). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter 140 or multiple transmitters 140 for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Wireless signals 130 may be transmitted and received according to multiple numerologies, such as those described with respect to FIGS. 1-6B. For example, network node 120 may transmit wireless signal 130a to wireless device 110a in cell 115 according to a first numerology. Network node 120 may transmit wireless signal 130b to wireless device 110b in cell 115 according to a second, different numerology.

To avoid inter-numerology interference, wireless device 110 and/or network node 120 may adjust transmission parameters to meet particular requirements associated with each numerology.

For example, network node 120 may obtain one or more requirements associated with each numerology. The one or more requirements may comprise an indication corresponding to a level of interference between a transmission using the first numerology and a transmission using the second numerology. The indication may correspond to a minimum requirement for interference (i.e., a minimum requirement to mitigate the interference). Network node 120 may obtain the one or more requirements or indication corresponding to the minimum requirement for interference by receiving the indication from a scheduler or receiving a preconfiguration based on a specification in a standard, product requirement, or test result. Network node 120 may adapt at least one of a first filter property and a first beamforming property of its wireless transmitter. Network node 120 may adapt a guard band size between the first numerology and the second numerology. Network node 120 may adapt the various properties to meet the minimum requirement for interference mitigation between the first numerology and the second numerology.

Wireless device 110 may obtain an indication corresponding to a minimum requirement for interference mitigation between a transmission using the first numerology and a transmission using the second numerology. Wireless device 110 may obtain the indication corresponding to the minimum requirement for interference mitigation by receiving the indication from a scheduler or receiving a preconfiguration based on a specification in a standard, product requirement, or test result. Wireless device 110 may adapt at least one of a first filter property and a first beamforming property of its wireless receiver. Wireless device 110 may adapt the various properties to meet the minimum requirement for interference mitigation between the first numerology and the second numerology.

Although the particular example above describes a downlink transmission from network node 120 to wireless device 110, other examples include uplink transmissions from wireless device 110 to network node 120. Particular algorithms for mitigating inter-numerology interference are described in more detail with respect to FIGS. 8-21.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 15A below. Similarly, a network node may include any suitable combination of hardware and/or software. For example, in particular embodiments, a network node, such as network node 120, may include the components described with respect to FIG. 16A below.

A transmitter may refer to a transmitter of a wireless signal, such as wireless device 110, network node 120, or any other radio component of network 100 capable of transmitting a radio signal. An example transmitter is illustrated in FIG. 8.

Figure 8:
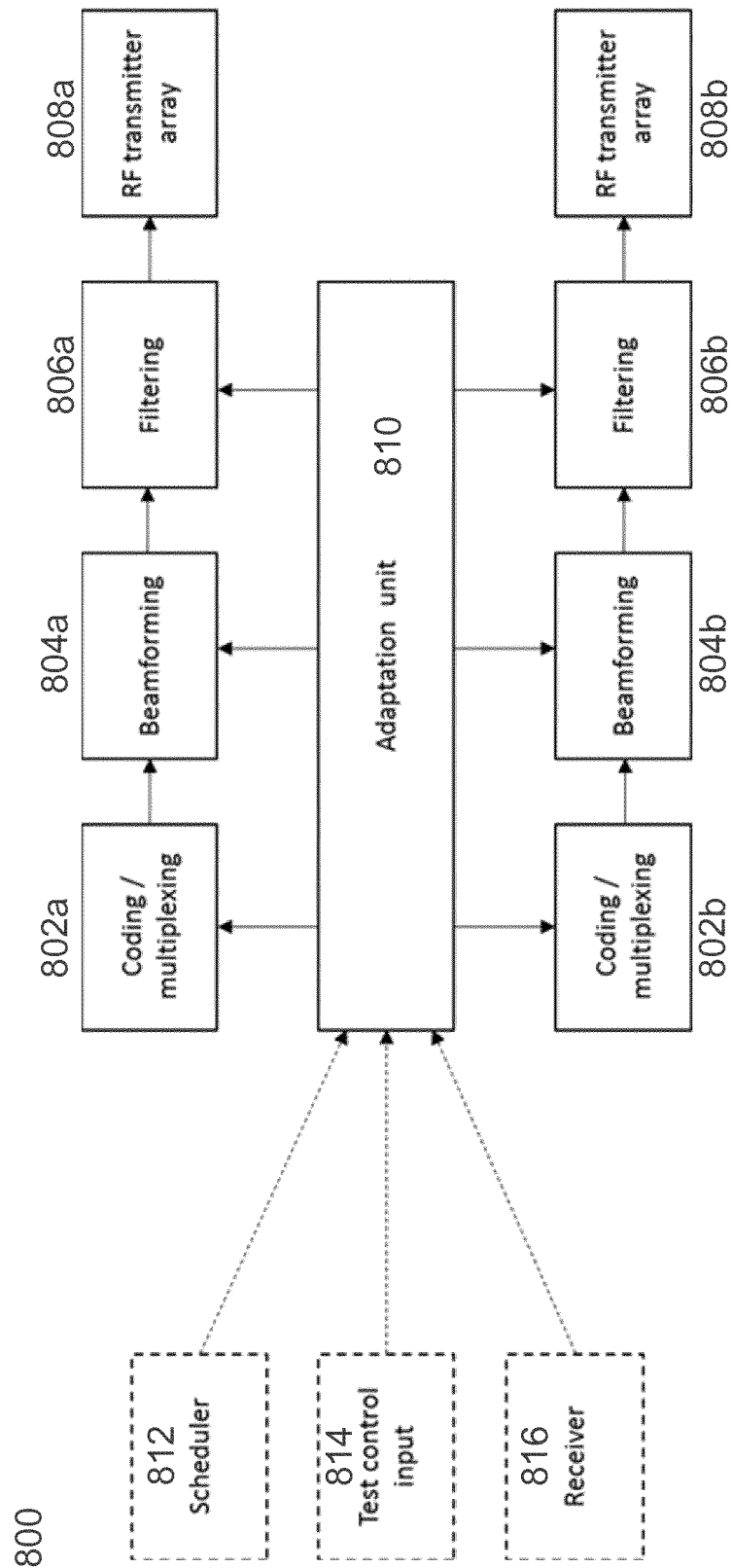
FIG. 8 is a block diagram illustrating an example two-numerology transmitter, according to a particular embodiment.

FIG. 8 is a block diagram illustrating an example two-numerology transmitter, according to a particular embodiment. Transmitter 800 is capable of transmitting two numerologies. Transmitter 800 includes two multiplexing and coding chains 802, two beamforming units 804, two filters 806, and two RF transmitter arrays 808. Each multiplexing and coding chain 802-808 is transmitted with a different numerology.

Adaptation unit 810 adapts the behavior of transmitter 800. For example, adaptation unit 810 may change the number of physical layer physical resource blocks (PRBs) that are utilized for a transmission. Adaptation unit 810 may change the filtering used in the physical layer.

Input to the adaptation unit 810 may come from scheduler 812, test control unit 814, and/or receiver 816. Scheduler 812 provides input that indicates which strategy (e.g., which filter and/or which beamforming settings) is used for transmission dependent on the indicated guard size. Test control unit 814 provides an indication of which set of requirements the transmitter is expected to meet, which is provided during testing. Receiver 816 provides input based on received signaling from another node indicating which set of requirements to meet. In particular embodiments, the indications may be direct indications, or may be implied from an indicated guard size or other suitable parameter.

In particular embodiments, network node 120 includes transmitter 800, and wireless device 110 includes transmitter 800. Wireless device 110 may receive signaling from network node 120 via receiver 816. Network node 120 may receive signaling from another network node or a core network node via receiver 816.

A transmitter, such as transmitter 800, may be subject to a plurality of requirements. Example requirements include one or more of the following.

(1) Requiring that only a small amount of subcarriers/PRB are not utilized between the numerologies (e.g., below a threshold number of subcarriers), that both numerologies are transmitted in the same direction, and that the EVM on both numerologies must be low (e.g., below a threshold interference level).

(2) Requiring that only a small amount of subcarriers/PRB are not utilized between the numerologies, that both numerologies are transmitted in the same direction, and that the EVM on the first numerology must be low, while the EVM on the second numerology may be higher (e.g., above a threshold interference level).

(3) Requiring that a larger amount of subcarriers/PRB are not utilized between the numerologies (e.g., above a threshold number of subcarriers), that both numerologies are transmitted in the same direction, and that the EVM on both numerologies must be low.

(4) Requiring that only a small amount of subcarriers/PRB are not utilized between the numerologies, that both numerologies are transmitted in the same direction and that the EVM on both numerologies may be high.

(5) Requiring that only a small amount of subcarriers/PRB are not utilized between the numerologies, that both numerologies are transmitted in the same direction, and that the in-band emissions from both numerologies must be low (e.g., below a threshold interference level).

(6) Requiring that only a small amount of subcarriers/PRB are not utilized between the numerologies, that both numerologies are transmitted in the same direction, and that the in-band emissions from the first numerology must be low, while the in-band emissions from the second numerology may be higher (e.g., above a threshold interference level).

(7) Requiring that a larger amount of subcarriers/PRB are not utilized between the numerologies, that both numerologies are transmitted in the same direction, and that the in-band emissions on both numerologies in the direction of the other numerology must be low.

(8) Requiring that only a small amount of subcarriers/PRB are not utilized between the numerologies, that both numerologies are transmitted in the same direction, and that the in-band emissions on both numerologies may be high.

These are a set of examples of requirements and the number of requirements may be lower or higher. Some embodiments may include additional combinations of requirements. It may be that all of the requirements are mandatory for the transmitter, or that some requirements are optional depending on the transmitter capability.

The transmitter unit is able to meet each of the requirements by adapting the coding and multiplexing chain, filtering, and beamforming depending on which requirement should be met. For example, by indicating to the transmitter unit which guard is used, a different filtering may be adopted. In some embodiments, the requirements may be based on a guard band size and the transmitter adapts the transmit chain based on the guard size. In some embodiments, the requirements may be based on an interference level, and the transmitter adapts the guard band size.

In some embodiments, a transmitter transmits a single numerology to a receiver capable of receiving more than one numerology. An example is illustrated in FIG. 9.

Figure 9:
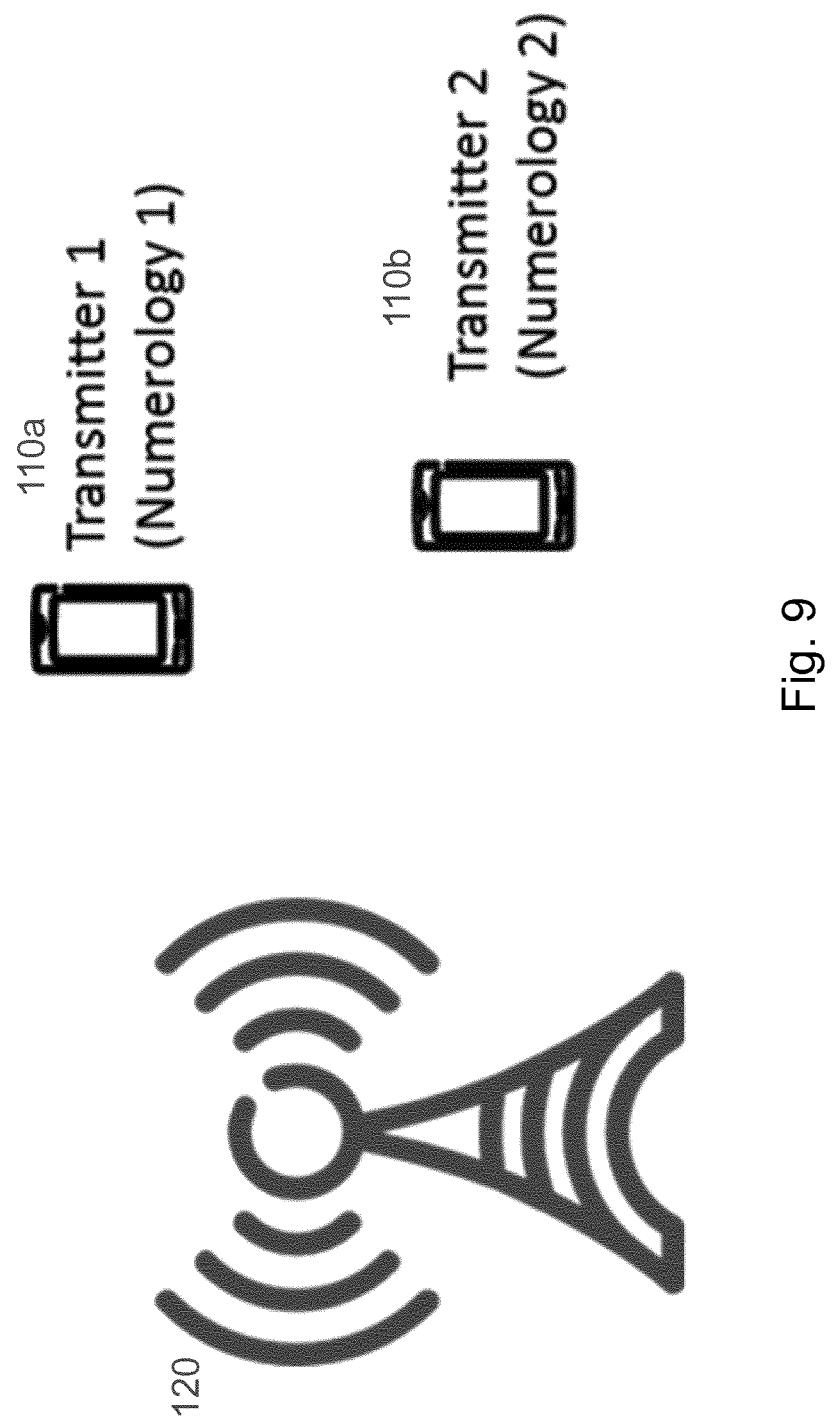
FIG. 9 is a block diagram of an example multi-numerology network with two transmitters each transmitting a different numerology to the same receiver.

FIG. 9 is a block diagram of an example multi-numerology network with two transmitters each transmitting a different numerology to the same receiver. Network node 120 receives a first numerology from wireless device 110a and a second numerology from wireless device 110b. An example of a transmitter for a single numerology is illustrated in FIG. 10.

Figure 10:
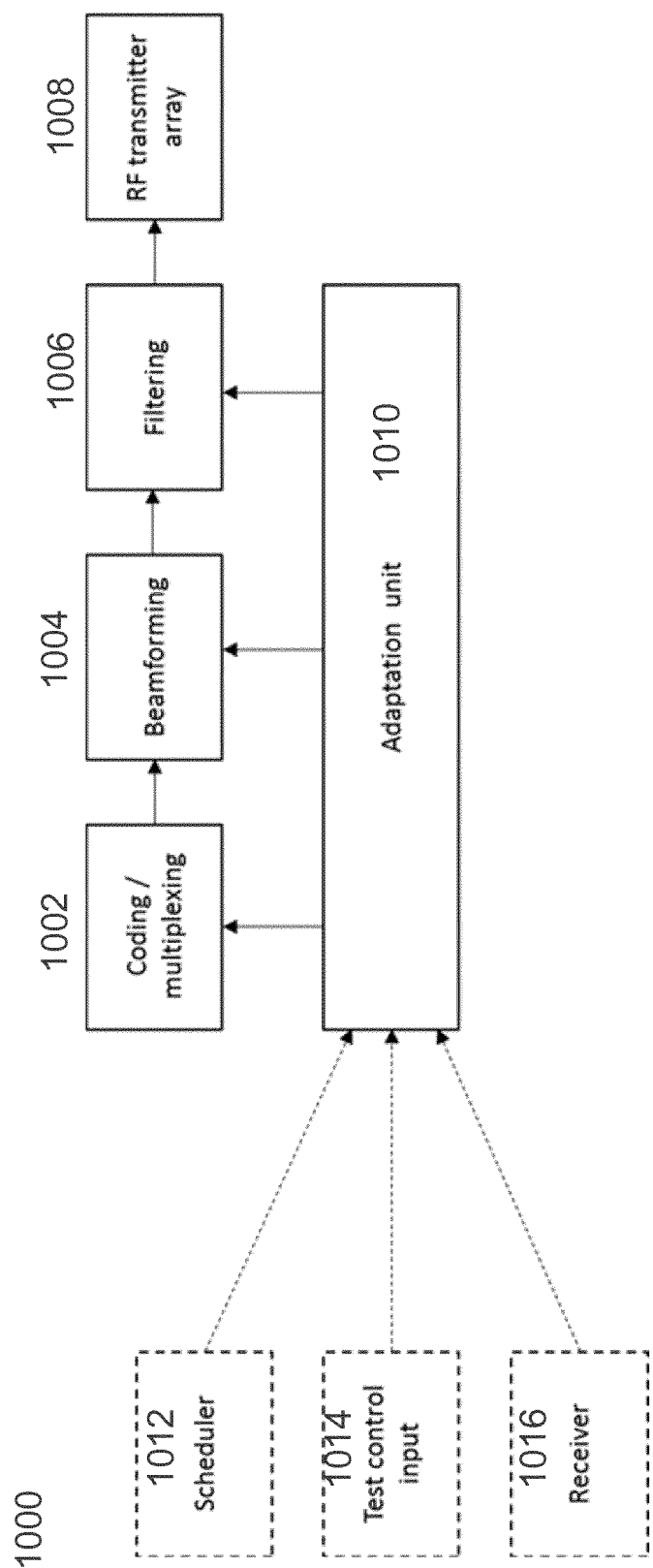
FIG. 10 is a block diagram of an example one-numerology transmitter, according to a particular embodiment.

FIG. 10 is a block diagram of an example one-numerology transmitter, according to a particular embodiment. Transmitter 1000 is capable of transmitting one numerology. Transmitter 1000 includes multiplexing and coding chain 1002, beamforming unit 1004, filter 1006, and RF transmitter array 1008. Multiplexing and coding chain 1002 is transmitted with a single numerology. Adaptation unit 1010 adapts the behavior of transmitter 1000 based on input from scheduler 1012, test control unit 1014, and/or receiver 1016.

In particular embodiments, transmitter 1000 is subject to a plurality of EVM and/or in-band unwanted emissions requirements. For example, another transmitter 1000 may be transmitting nearby using a different numerology. A set of requirements may apply to each transmitter 1000 to mitigate interference between the two transmitters 1000. Adaptation unit 1010 adapts the coding and multiplexing, beamforming, and filtering such that each requirement can be met.

A receiver may refer to a receiver of a wireless signal, such as wireless device 110, network node 120, or any other radio component of network 100 capable of receiving a radio signal. An example receiver is illustrated in FIG. 11.

Figure 11:
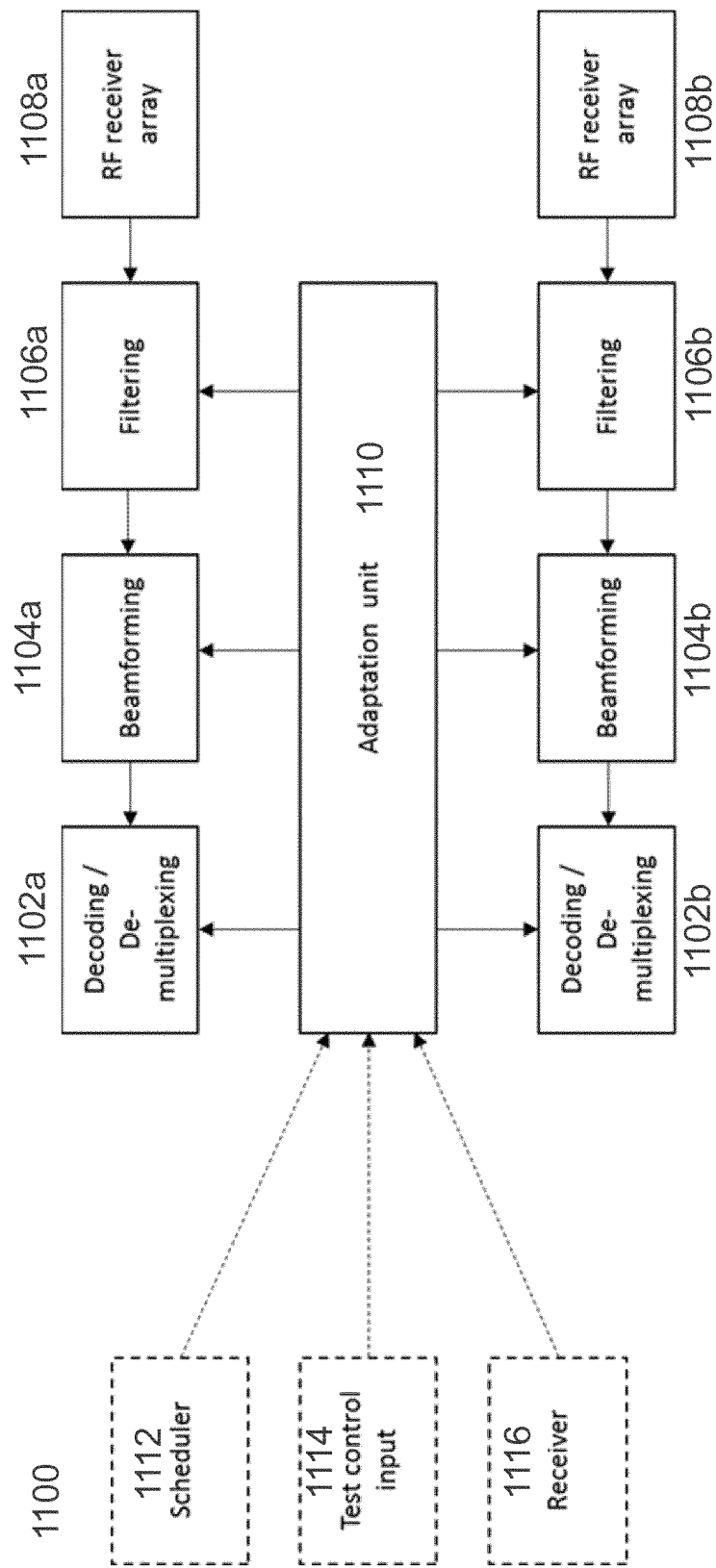
FIG. 11 is a block diagram illustrating an example two-numerology receiver, according to a particular embodiment.

FIG. 11 is a block diagram illustrating an example two-numerology receiver, according to a particular embodiment. Receiver 1100 is capable of receiving two numerologies. Receiver 1100 includes two RF receiver arrays 1108, two filters 1106, two beamforming units 1104, and two demultiplexing and decoding chains 1102. Each demultiplexing and decoding chain 1102 is received with a different numerology.

Adaptation unit 1110 adapts the behavior of receiver 1100. For example, adaptation unit 1110 may change the number of physical layer physical resource blocks (PRBs) that are utilized for a transmission. Adaptation unit 1110 may change the filtering used in the physical layer.

Input to the adaptation unit 1110 may come from scheduler 1112, test control unit 1114, and/or receiver 1116. Scheduler 1112 provides input that indicates which strategy (e.g., which filter and/or which beamforming settings) is used for transmission. Test control unit 1114 provides an indication of which set of requirements the transmitter is expected to meet, which is provided during testing. Receiver 1116 provides input based on received signaling from another node indicating which set of requirements to meet. In particular embodiments, the indications may be direct indications, or may be implied from an indicated guard size or other suitable parameter. In particular embodiments, network node 120 includes receiver 1100, and wireless device 110 includes receiver 1100.

A receiver, such as receiver 1100, may be subject to a plurality of requirements. Example requirements include one or more of the following.

(1) Requiring that only a small amount of subcarriers/PRB are not utilized between the numerologies (e.g., below a threshold number of subcarriers), that both numerologies are received from the same direction, and that the inter-numerology interference must be low (e.g., below a threshold interference level), and/or high data rate demodulation performance must be achieved.

(2) Requiring that only a small amount of subcarriers/PRB are not utilized between the numerologies, that both numerologies are received from the same direction, and that the inter-numerology interference on the first numerology must be low (and/or demodulation data rate high), while the inter-numerology interference on the second numerology can be higher (and/or demodulation data rate lower) (e.g., above a threshold interference level).

(3) Requiring that a larger amount of subcarriers/PRB are not utilized between the numerologies (e.g., above a threshold number of subcarriers), that both numerologies are received from the same direction, and that the inter-numerology interference must be low (and/or demodulation data rate on the numerologies high).

(4) Requiring that only a small amount of subcarriers/PRB are not utilized between the numerologies, that both numerologies are received from the same direction, and that the inter-numerology interference may be high (or demodulation data rate low).

(5) Requiring that only a small amount of subcarriers/PRB are not utilized between the numerologies, that both numerologies are received from the same direction, and that the receiver can receive one numerology correctly in the presence of interference or blocking signals from the other numerology.

(6) Requiring that a larger amount of subcarriers/PRB are not utilized between the numerologies, that both numerologies are received from the same direction, and that the receiver can receive one numerology correctly in the presence of interference or blocking signals from the other numerology.

(7) Requiring that only a small amount of subcarriers/PRB are not utilized between the numerologies, that both numerologies are received from different directions, and that the receiver can receive one numerology correctly in the presence of interference or blocking signals from the other numerology.

These are a set of examples of requirements and the number of requirements may be lower or higher. Some embodiments may include additional combinations of requirements. It may be that all of the requirements are mandatory for the receiver, or that some requirements are optional depending on the receiver capability.

The receiver unit is able to meet each of the requirements by adapting the decoding and demultiplexing chain, filtering, and beamforming depending on which requirement should be met. For example, by indicating to the receiver unit which guard is used, a different filtering may be adopted. In some embodiments, the requirements may be based on a guard band size and the receiver adapts the receiver chain based on the guard size. In some embodiments, the requirements may be based on an interference level, and the receiver adapts the guard band size.

In some embodiments, a receiver receives a single numerology in a network in which two different receivers simultaneously receive different numerologies from each other. An example is illustrated in FIG. 9. Referring back to FIG. 9, wireless device 110a receives a first numerology from network node 120 and wireless device 110b receives a second numerology from network node 120. An example of a receiver for a single numerology is illustrated in FIG. 12.

Figure 12:
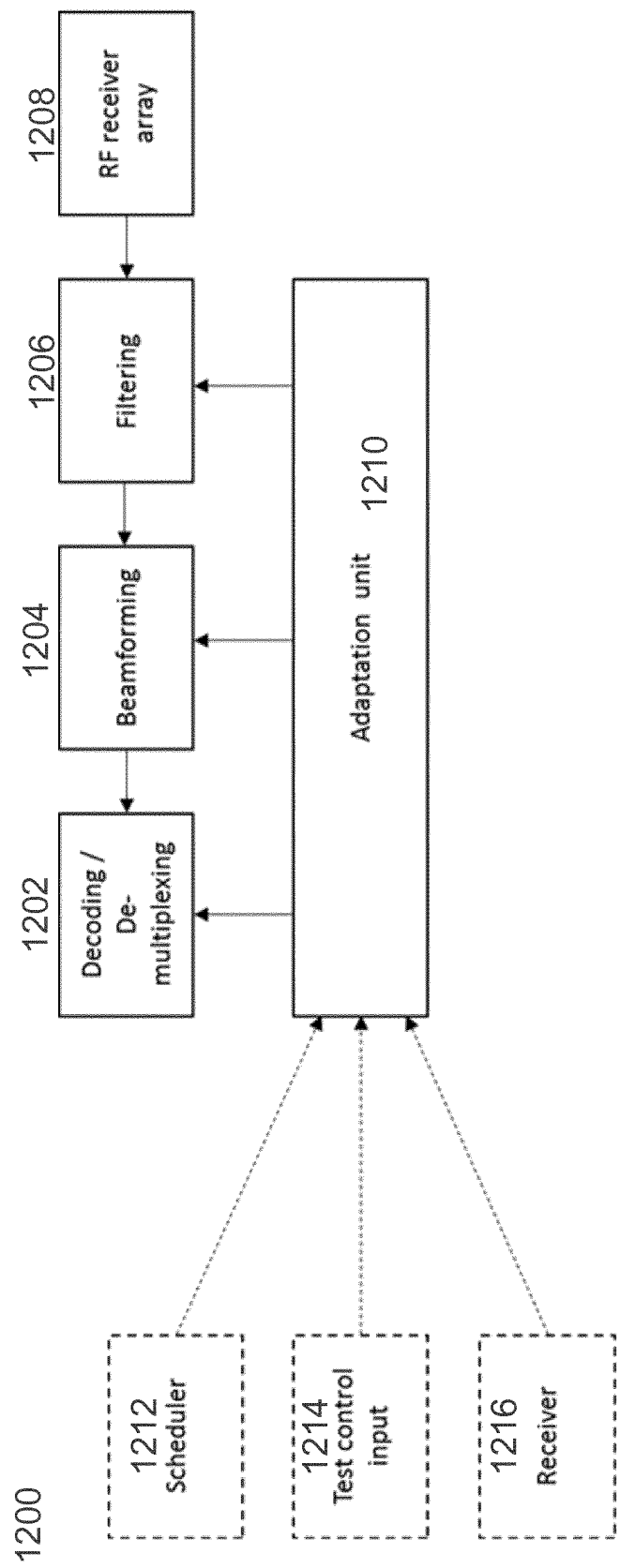
FIG. 12 is a block diagram of an example one-numerology receiver, according to a particular embodiment.

FIG. 12 is a block diagram of an example one-numerology receiver, according to a particular embodiment. Receiver 1200 is capable of receiving a single numerology. Receiver 1200 includes RF receiver array 1208, filter 1206, beamforming unit 1204, and demultiplexing and decoding chain 1202. Demultiplexing and decoding chain 1202 is received with a single numerology. Adaptation unit 1210 adapts the behavior of receiver 1200 based on input from scheduler 1212, test control unit 1214, and/or receiver 1216.

In particular embodiments, receiver 1200 is subject to demodulation and/or selectivity requirements. Adaptation unit 1210 adapts the decoding and demultiplexing, beamforming, and filtering such that each requirement can be met.

Particular embodiments may include methods in a wireless device or a network node. Example flowcharts are illustrated in FIGS. 13 and 14.

Figure 13:
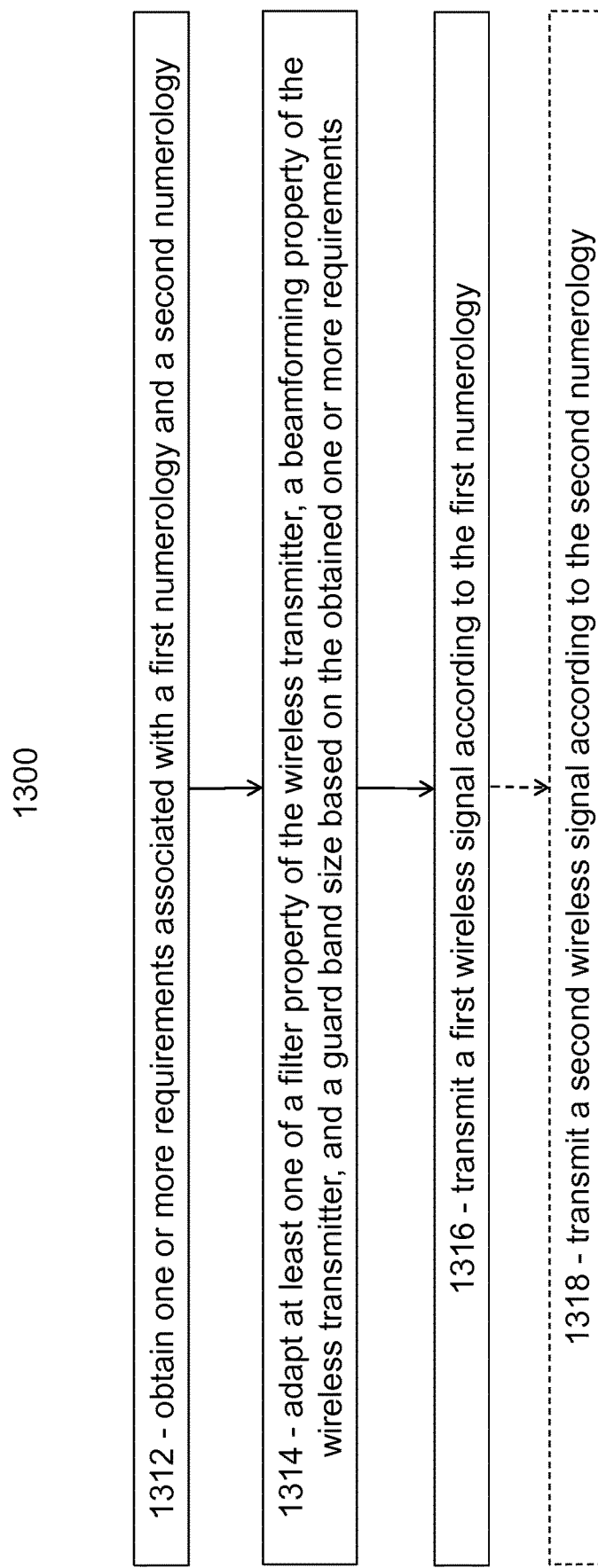
FIG. 13 is a flow diagram illustrating an example method in a wireless transmitter of transmitting a wireless signal, according to some embodiments.
Figure 14:
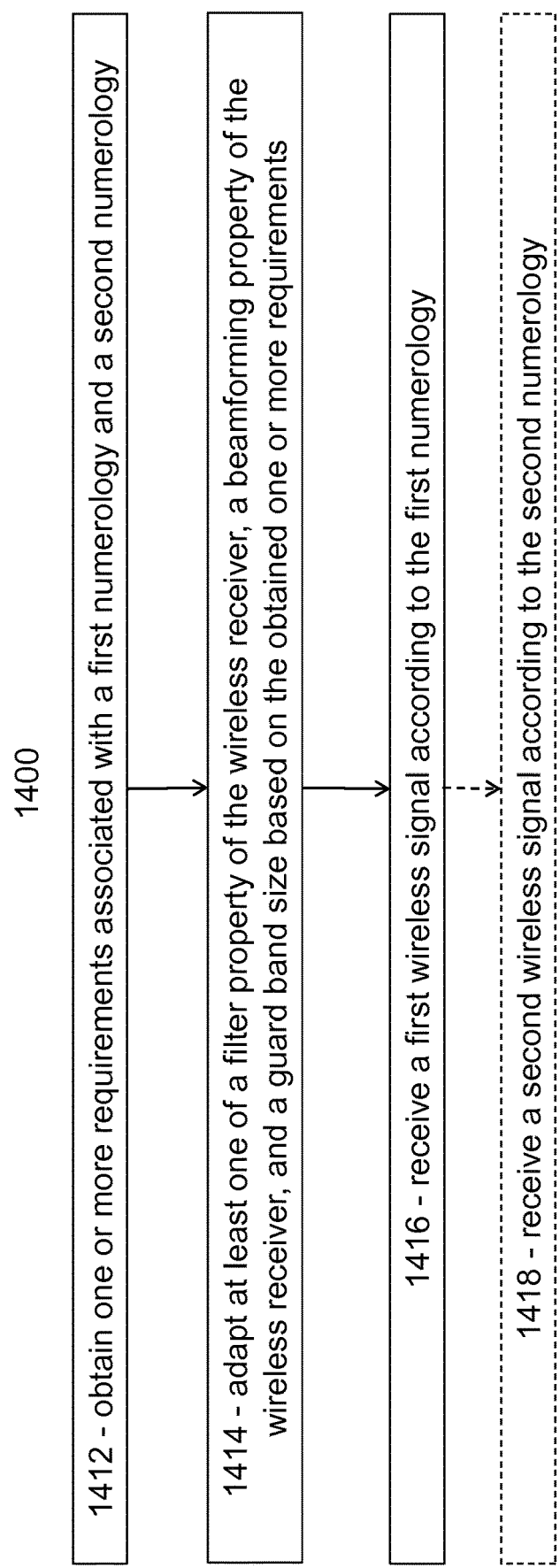
FIG. 14 is a flow diagram illustrating an example method in a wireless receiver of receiving a wireless signal, according to some embodiments.

FIG. 13 is a flow diagram illustrating an example method in a wireless transmitter of transmitting a wireless signal, according to some embodiments. In particular embodiments, one or more steps of FIG. 13 may be performed by components of wireless network 100 (e.g., network node 120, wireless device 110) described with respect to FIG. 7.

The method begins at step 1312, where a wireless transmitter obtains one or more requirements associated with each numerology. The transmitter should meet the requirements when transmitting a wireless signal according to the first numerology. The one or more requirements are based on the first numerology and the second numerology. The requirements may comprise an indication corresponding to a level of interference between a transmission using the first numerology and a transmission using the second numerology. For example, the indication may correspond to a minimum requirement for interference mitigation between a transmission using the first numerology and a transmission using the second numerology. For example, network node 120 may receive requirements from another component of network 100.

In particular embodiments, the indication of the minimum interference level comprises at least one of an indication that a number of unused subcarriers between the first numerology and the second numerology (i.e., guard band size) is above or below a threshold number of subcarriers (e.g., higher or lower), an indication that the interference level for the first numerology is above or below a threshold interference level (e.g., EVM or in-band emission interference is higher or lower), and an indication that the interference level for the second numerology is above or below the threshold interference level (e.g., EVM or in-band emission interference is higher or lower).

In particular embodiments, obtaining the one or more requirements associated with each numerology or indication corresponding to the minimum requirement for interference mitigation may comprise receiving the indication from a scheduler or receiving a preconfiguration based on a specification in a standard, product requirement, or test result. The wireless transmitter may receive the requirements according to any of the embodiments described with respect to FIGS. 8-12.

At step 1314, the wireless transmitter adapts at least one of the guard band size, number of physical resource blocks (PRBs), beamforming functionality and physical filter used to transmit the wireless signal based on the obtained requirements. For example, network node 120 may increase or decrease the number of PRBs used to transmit wireless signal 130 to wireless device 110. Network node 120 may adapt the guard band size between the numerologies. Network node 120 may adapt the beamforming functionality or filter properties based on the received requirements. Particular embodiments may adapt some, none, or all of the various properties. The wireless transmitter may adapt the transmitted signal according to any of the embodiments described with respect to FIGS. 8-12.

At step 1316, the wireless transmitter transmits the wireless signal according to the first numerology. For example, network node 120 may transmit wireless signal 130a to wireless device 110a according to the first numerology.

At step 1318, the wireless transmitter may transmit a second wireless signal according to the second numerology. For example, network node 120 may transmit wireless signal 130b to wireless device 110b according to the second numerology. In some embodiments, a wireless device may be capable of receiving two (or more) numerologies. In some embodiments, the wireless transmitter may perform the adapting function of step 1314 on a second transmitter chain used to transmit the second wireless signal.

Modifications, additions, or omissions may be made to method 1300. Additionally, one or more steps in method 1300 of FIG. 13 may be performed in parallel or in any suitable order. The steps of method 1300 may be repeated over time as necessary.

FIG. 14 is a flow diagram illustrating an example method in a wireless receiver of receiving a wireless signal, according to some embodiments. In particular embodiments, one or more steps of FIG. 14 may be performed by components of wireless network 100 (e.g., network node 120, wireless device 110) described with respect to FIG. 7.

The method begins at step 1412, where a wireless receiver obtains one or more requirements for the receiver to meet when receiving a wireless signal according to the first numerology. The one or more requirements are based on the first numerology and the second numerology. The requirements may include an indication corresponding to a level of interference between a transmission using the first numerology and a transmission using the second numerology. For example, the indication may correspond to a minimum requirement for interference mitigation between a transmission using the first numerology and a transmission using the second numerology. For example, wireless device 110 may obtain requirements from another component of network 100, such as network node 120.

In particular embodiments, the one or more requirements comprises at least one of an indication that a number of unused subcarriers between the first numerology and the second numerology (i.e., guard band size) is above or below a threshold number of subcarriers (e.g., higher or lower), an indication that the interference level for the first numerology is above or below a threshold interference level (e.g., demodulation and/or selectivity thresholds are higher or lower), and an indication that the interference level for the second numerology is above or below the threshold interference level (e.g., demodulation and/or selectivity thresholds are higher or lower).

In particular embodiments, obtaining the one or more requirements may comprise receiving the indication from a scheduler or receiving a preconfiguration based on a specification in a standard, product requirement, or test result. The wireless receiver may receive the requirements according to any of the embodiments described with respect to FIGS. 8-12.

At step 1414, the wireless receiver adapts at least one of the guard band size, number of physical resource blocks (PRBs), beamforming functionality and physical filter used to receive the wireless signal based on the received requirements. For example, wireless device 110 may increase or decrease the number of PRBs used to receive wireless signal 130 from network node 120. Wireless device 110 may adapt the beamforming functionality or filter properties based on the received requirements. Particular embodiments may adapt some, none, or all of the various properties. The wireless receiver may adapt the received signal according to any of the embodiments described with respect to FIGS. 8-12.

At step 1416, the wireless receiver receives the wireless signal according to the first numerology. For example, wireless device 110 may receive wireless signal 130 from network node 120 according to the first numerology.

At step 1418, the wireless receiver may receive a second wireless signal according to the second numerology. For example, network node 120 may transmit wireless signal 130b to wireless device 110a according to the second numerology. In some embodiments, the wireless receiver may perform the adapting function of step 1314 on a second receiver chain used to receive the second wireless signal.

Modifications, additions, or omissions may be made to method 1400. Additionally, one or more steps in method 1400 of FIG. 14 may be performed in parallel or in any suitable order. The steps of method 1400 may be repeated over time as necessary.

Although the embodiments described herein use examples of downlink from a network node to a wireless device, other embodiments may perform the same for uplink, or for wireless communication between any suitable components of network 100.

Figure 15B:
FIG. 15B is a block diagram illustrating example components of a wireless device.
Figure 15A:
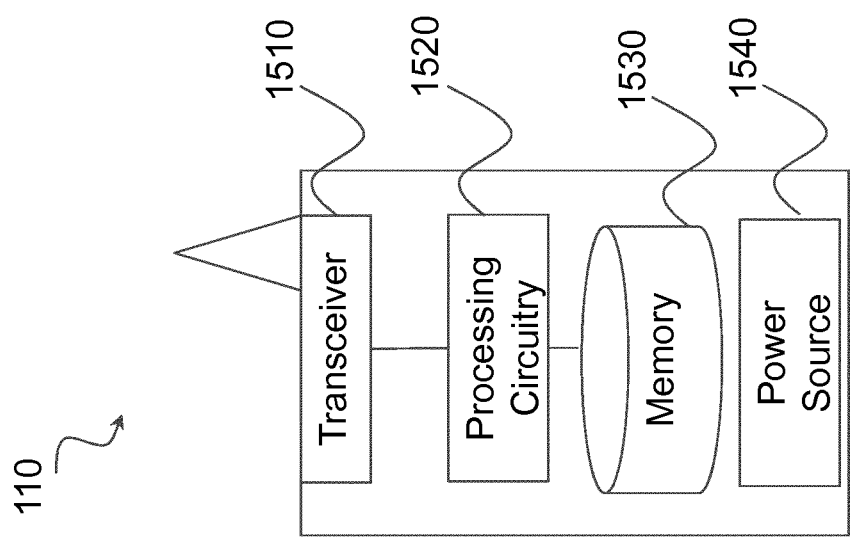
FIG. 15A is a block diagram illustrating an example embodiment of a wireless device.

FIG. 15A is a block diagram illustrating an example embodiment of a wireless device. The wireless device is an example of the wireless devices 110 illustrated in FIG. 7. In particular embodiments, the wireless device is capable of transmitting and/or receiving wireless signals in a network capable of supporting more than one numerology. The wireless device is capable of obtaining one or more requirements associated to each numerology; adapting at least one of a first filter property of the wireless device, a first beamforming property of the wireless device, and a guard band size between the first numerology and the second numerology based on the obtained one or more requirements; and transmitting/receiving the first wireless signal according to the first numerology. The wireless device is further capable of adapting at least one of a second filter property of the wireless device and a second beamforming property of the wireless device, and transmitting/receiving a second wireless signal according to the second numerology.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes processing circuitry 1500. Processing circuitry 1500 includes transceiver 1510, processing circuitry 1520, memory 1530, and power source 1540. In some embodiments, transceiver 1510 facilitates transmitting wireless signals to and receiving wireless signals from wireless network node 120 (e.g., via an antenna), processing circuitry 1520 executes instructions to provide some or all of the functionality described herein as provided by the wireless device, and memory 1530 stores the instructions executed by processing circuitry 1520. Power source 1540 supplies electrical power to one or more of the components of wireless device 110, such as transceiver 1510, processing circuitry 1520, and/or memory 1530.

Processing circuitry 1520 includes any suitable combination of hardware and software implemented in one or more integrated circuits or modules to execute instructions and manipulate data to perform some or all of the described functions of the wireless device. In some embodiments, processing circuitry 1520 may include, for example, one or more computers, one more programmable logic devices, one or more central processing units (CPUs), one or more microprocessors, one or more applications, and/or other logic, and/or any suitable combination of the preceding. Processing circuitry 1520 may include analog and/or digital circuitry configured to perform some or all of the described functions of wireless device 110. For example, processing circuitry 1520 may include resistors, capacitors, inductors, transistors, diodes, and/or any other suitable circuit components.

Memory 1530 is generally operable to store computer executable code and data. Examples of memory 1530 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1540 is generally operable to supply electrical power to the components of wireless device 110. Power source 1540 may include any suitable type of battery, such as lithium-ion, lithium-air, lithium polymer, nickel cadmium, nickel metal hydride, or any other suitable type of battery for supplying power to a wireless device. In particular embodiments, processing circuitry 1520 in communication with transceiver 1510 transmits and/or receives wireless signals in a network capable of supporting more than one numerology.

Other embodiments of the wireless device may include additional components (beyond those shown in FIG. 15A) responsible for providing certain aspects of the wireless device's functionality, including any of the functionality described above and/or any additional functionality (including any functionality necessary to support the solution described above).

FIG. 15B is a block diagram illustrating example components of a wireless device 110. In some embodiments, the wireless device may include the transmitter and receiver components described with respect to FIGS. 8-14. In general, the components may include requirement receiving module 1550, adapting module 1552, receiving module 1554, and transmitting module 1556. In at least one embodiment, the modules are implemented as a computer program running on the processor. In some embodiments the modules include one or more hardware components, or a combination of hardware and software components.

Requirement receiving module 1550 may perform the obtaining functions of wireless device 110. For example, requirement receiving module 1550 may obtain requirements for transmitting or receiving a wireless signal according to a particular numerology. Requirement receiving module 1550 may obtain one or more requirements associated to each numerology, according to any of the examples and embodiments described with respect to FIGS. 7-14. In certain embodiments, requirement receiving module 1550 may include or be included in processing circuitry 1520. In particular embodiments, requirement receiving module 1550 may communicate with adapting module 1552.

Adapting module 1552 may perform the adapting functions of wireless device 110. For example, adapting module 1552 may adapt transmission or reception parameters of a wireless signal according to any of the embodiments described with respect to FIGS. 7-14. In certain embodiments, adapting module 1552 may include or be included in processing circuitry 1520. In particular embodiments, adapting module 1552 may communicate with requirement receiving module 1550, receiving module 1554, and transmitting module 1556.

Receiving module 1554 may perform the receiving functions of wireless device 110. For example, receiving module 1554 may receive wireless signal 130 from network node 120 according to a particular numerology. In certain embodiments, receiving module 1554 may include or be included in processing circuitry 1520. In particular embodiments, receiving module 1554 may communicate with adapting module 1552.

Transmitting module 1556 may perform the transmitting functions of wireless device 110. For example, transmitting module 1556 may transmit wireless signal 130 to network node 120 according to a particular numerology. In certain embodiments, transmitting module 1556 may include or be included in processing circuitry 1520. In particular embodiments, transmitting module 1556 may communicate with adapting module 1552.

FIG. 16A is a block diagram illustrating an example embodiment of a network node. The network node is an example of the network node 120 illustrated in FIG. 7. In particular embodiments, the network node is capable of transmitting and/or receiving wireless signals in a network capable of supporting more than one numerology. The network node is capable of obtaining one or more requirements associated with each numerology; adapting at least one of a first filter property of the network node, a first beamforming property of the network node, and a guard band size between the first numerology and the second numerology based on the obtained one or more requirements; and transmitting/receiving the first wireless signal according to the first numerology. The network node is further capable of adapting at least one of a second filter property of the network node and a second beamforming property of the network node, and transmitting/receiving a second wireless signal according to the second numerology.

Network node 120 can be an eNodeB, a nodeB, a gNB, a base station, a wireless access point (e.g., a Wi-Fi access point), a low power node, a base transceiver station (BTS), a transmission point or node, a remote RF unit (RRU), a remote radio head (RRH), or other radio access node. The network node includes processing circuitry 1600. Processing circuitry 1600 includes at least one transceiver 1610, at least one processing circuitry 1620, at least one memory 1630, and at least one network interface 1640. Transceiver 1610 facilitates transmitting wireless signals to and receiving wireless signals from a wireless device, such as wireless devices 110 (e.g., via an antenna); processing circuitry 1620 executes instructions to provide some or all of the functionality described above as being provided by a network node 120; memory 1630 stores the instructions executed by processing circuitry 1620; and network interface 1640 communicates signals to backend network components, such as a gateway, switch, router, Internet, Public Switched Telephone Network (PSTN), controller, and/or other network nodes 120. Processing circuitry 1620 and memory 1630 can be of the same types as described with respect to processing circuitry 1520 and memory 1530 of FIG. 15A above.

In some embodiments, network interface 1640 is communicatively coupled to processing circuitry 1620 and refers to any suitable device operable to receive input for network node 120, send output from network node 120, perform suitable processing of the input or output or both, communicate to other devices, or any combination of the preceding. Network interface 1640 includes appropriate hardware (e.g., port, modem, network interface card, etc.) and software, including protocol conversion and data processing capabilities, to communicate through a network. In particular embodiments, processing circuitry 1620 in communication with transceiver 1610 transmits and/or receives wireless signals in a network capable of supporting more than one numerology.

Other embodiments of network node 120 include additional components (beyond those shown in FIG. 16A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

Figure 16B:
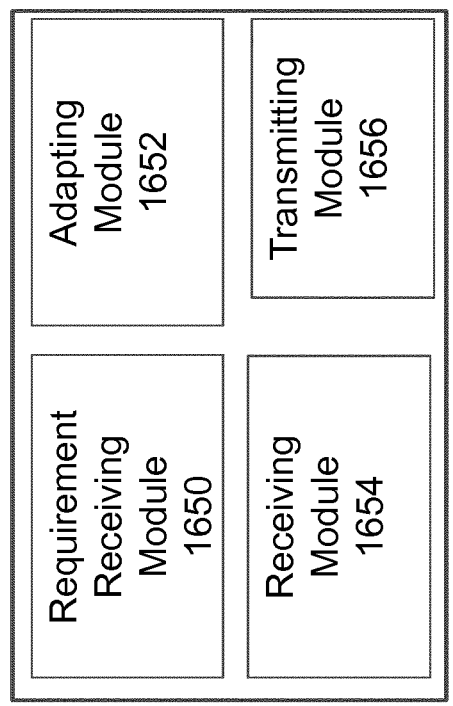
FIG. 16B is a block diagram illustrating example components of a wireless device.
Figure 16:
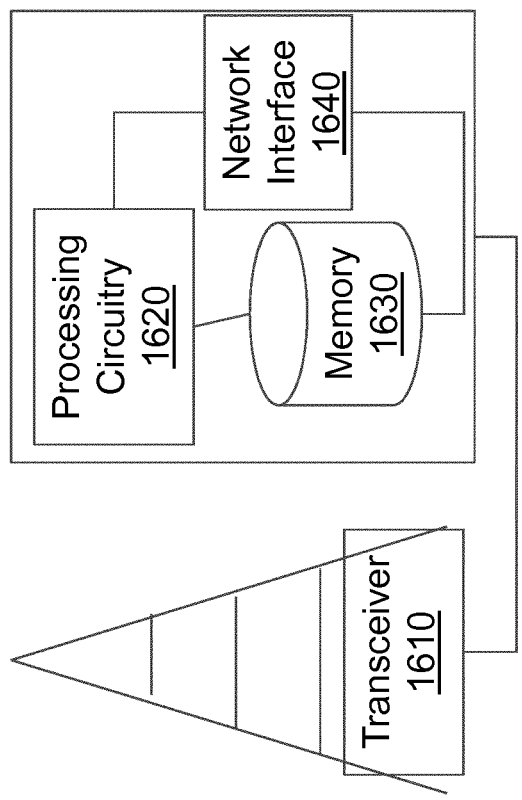
FIG. 16A is a block diagram illustrating an example embodiment of a network node.

FIG. 16B is a block diagram illustrating example components of a network node 120. In some embodiments, the network node may include the transmitter and receiver components described with respect to FIGS. 8-14. In general, the components may include requirement receiving module 1650, adapting module 1652, receiving module 1654, and transmitting module 1656. In some embodiments the modules include one or more hardware components, or a combination of hardware and software components.

Requirement receiving module 1650 may perform the receiving functions of network node 120. For example, requirement receiving module 1650 may receive requirements for transmitting or receiving a wireless signal according to a particular numerology. Requirement receiving module 1650 may obtain one or more requirements associated with each numerology, according to any of the examples and embodiments described with respect to FIGS. 7-14. In certain embodiments, requirement receiving module 1650 may include or be included in processing circuitry 1620. In particular embodiments, requirement receiving module 1650 may communicate with adapting module 1652.

Adapting module 1652 may perform the adapting functions of network node 120. For example, adapting module 1652 may adapt transmission or reception parameters of a wireless signal according to any of the embodiments described with respect to FIGS. 7-14. In certain embodiments, adapting module 1652 may include or be included in processing circuitry 1620. In particular embodiments, adapting module 1652 may communicate with requirement receiving module 1650, receiving module 1654, and transmitting module 1656.

Receiving module 1654 may perform the receiving functions of network node 120. For example, receiving module 1654 may receive wireless signal 130 from wireless device 110 according to a particular numerology. In certain embodiments, receiving module 1654 may include or be included in processing circuitry 1620. In particular embodiments, receiving module 1654 may communicate with adapting module 1652.

Transmitting module 1656 may perform the transmitting functions of network node 120. For example, transmitting module 1656 may transmit wireless signal 130 to wireless device 110 according to a particular numerology. In certain embodiments, transmitting module 1656 may include or be included in processing circuitry 1620. In particular embodiments, transmitting module 1656 may communicate with adapting module 1652.

Particular aspects of some embodiments may be implemented within the framework of a specific communication standard. In particular, the following examples provide a non-limiting example of how some embodiments may be implemented within the framework of a 3GPP TSG RAN standard. The changes described by the examples are merely intended to illustrate how certain aspects of particular embodiments may be implemented in a particular standard. However, particular embodiments may also be implemented in other suitable manners, both in the 3GPP Specification and in other specifications or standards.

3GPP includes in-band requirements when operating with dual numerology. Particular examples focus on downlink for the purpose simplifying the discussion, but particular examples also apply in the uplink. To understand the need for flexibility in dealing with multi-numerology transmission, some potential instantaneous scenarios are described, along with potential means for a gNB to optimize transmission in the scenarios.

A first scenario is illustrated in FIG. 5 that includes high SINR and both numerologies are in the same direction with respect to the gNB. In this scenario, both links are susceptible to degradation due to self-interference. There are at least three potential ways for the gNB to handle transmit distortion. The gNB may transmit a small or no guard band between the numerologies and apply sharp filtering to reduce interference between numerologies. The sharp filtering will reduce inter-numerology interference, but increase EVM.

The gNB may transmit a small or no guard band between the numerologies, and not apply sharp filtering between the numerologies. This approach will lead to more inter-numerology interference than the first approach but less filter induced EVM.

The gNB may transmit with a larger guard band than in the first two examples. This will reduce PRB utilization but will avoid inter-numerology interference and filter induced EVM. A higher MCS may be selected to compensate for the reduced PRB utilization.

Which of these approaches is optimal may depend on link conditions, scheduling strategies, etc. Furthermore, the requirements on UE selectivity and UE performance may impact which strategy is optimal. If little or no guard band is selected by the gNB and the UE selectivity is such that the interference into the UE receiver is greater than the EVM from the gNB transmitter, then either of the first two transmit strategies may yield the same effect and it may be that the third strategy (larger guard band) is the optimal.

Another scenario is illustrated in FIG. 4B that includes high or low SINR and receivers of different numerologies that are located such that the different numerologies are received from different directions. In this scenario, if there is beamforming at the gNB then interference between numerologies on the transmit side and selectivity on the UE side is mitigated by spatial discrimination. It is preferable not to use sharp filtering at the transmit side, because this will induce EVM in the filtered signal with little benefit because the interference between numerologies is mitigated spatially.

In case the gNB does not perform beamforming, the same considerations as in the first scenario are applicable for the high SINR case and in scenario four below for the low SINR case. A third scenario is illustrated in FIG. 17.

Figure 17:
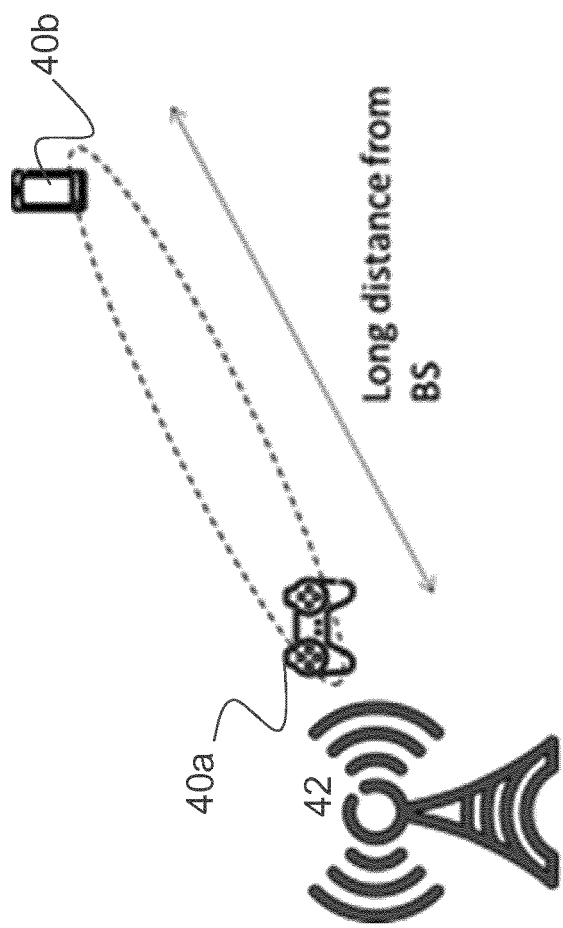
FIG. 17 illustrates an example multi-numerology network with receivers near the cell edge and near the transmitter.

FIG. 17 illustrates an example multi-numerology network with receivers near the cell edge and near the transmitter. In this situation, self-interference on a first numerology due to the low SINR and self-interference on a second numerology reduces throughput. Thus, it is preferable to not apply sharp filtering on the second numerology to avoid inducing EVM, but to apply a sharp filtering on the first numerology. Two potential strategies for the gNB to approach scheduling are: (a) use a narrow guard band with sharp filtering of the first numerology 1 and not sharp filtering of the second numerology; or (b) use a slightly larger guard band without the need for filtering on the first numerology.

In this circumstance, when considering gNB interference only, the first strategy with a small guard band is likely to be the most optimal. However, the usefulness of the first strategy will also depend on the selectivity performance of the UE. If UE selectivity is such that a low guard band would cause significant interference in the UE receiver, then the second strategy may be more appropriate.

A fourth scenario is illustrated in FIG. 4A that includes low SINR for both numerologies. If the link SINR is low for both numerologies, then self-interference is less likely to impact link throughput. The gNB may try to keep any guard band as low as possible (potentially no guard band). Sharp filtering and tight UE selectivity may not be important. Considering these scenarios, the size of the guard band that may be needed can depend on the instantaneous conditions for the scheduled numerologies. Thus, in the specification the guard may not be fixed; it may be a gNB scheduler decision. Furthermore, there may be different approaches to the tradeoff between filtering and EVM in the gNB. The gNB may dynamically change the filtering approach depending on the scheduling situation to be optimal (although not all architectures may support this). Also, the UE requirements on selectivity may impact the optimal approach to gNB scheduling.

Particular solutions include setting EVM and possible in band emissions requirements in a manner that does not constrain implementations. A first approach sets a single requirement that is based on assuming a larger guard between the numerologies. An example is illustrated in FIG. 18.

Figure 18:
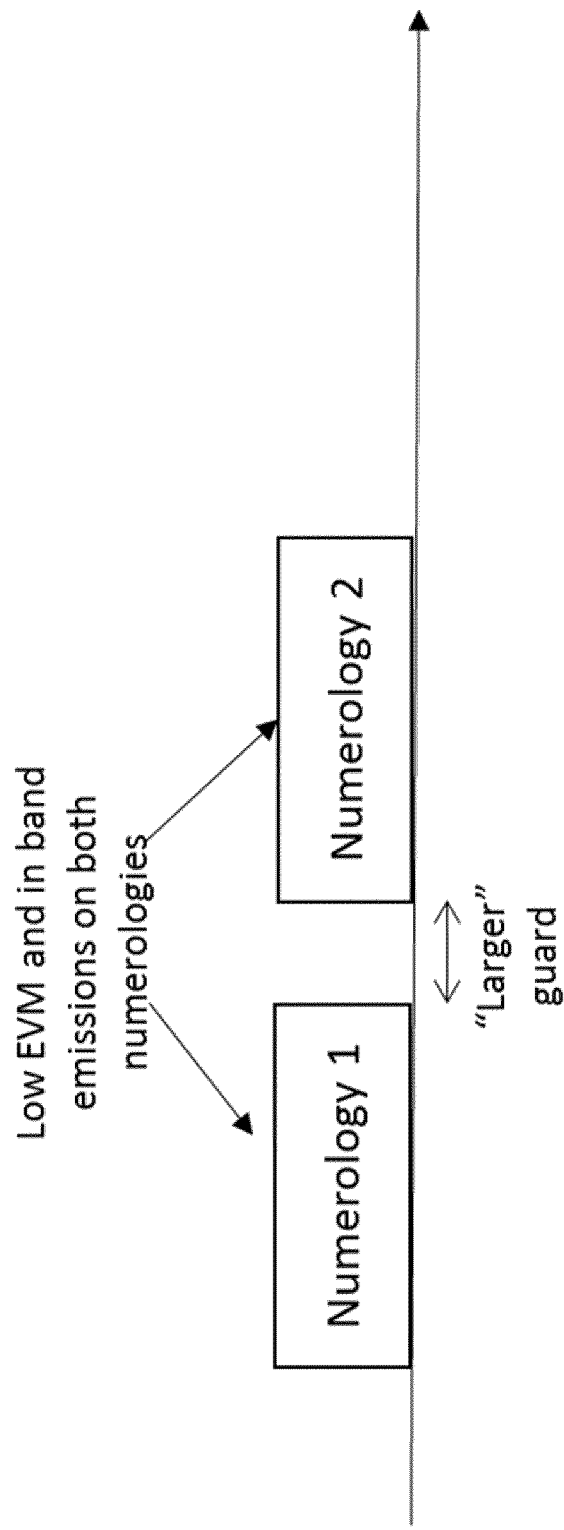
FIG. 18 illustrates an example of two numerologies with a relatively large guard band.

FIG. 18 illustrates an example of two numerologies with a relatively large guard band. With this approach, a minimum requirement on EVM is set, with the requirement stated assuming that the gNB assumes a relatively large guard band between the numerologies. This approach does not fix the guard band in the specifications such that the gNB cannot select lower guard band sizes; it is a reference point for the purpose of the requirement. The size of the guard assumed by the requirement should be such that any approach to guard band size and any approach to filtering (and the associated inter-numerology interference or EVM induced from the filter) may be used. If the eNB selects to use a smaller guard band than envisaged by the requirement, then the resulting EVM and interference between numerologies will not be guaranteed by node B or UE requirements. However, in situations of low SINR or spatially differentiated users this might be acceptable.

A second approach sets two requirements. One requirement assuming large guard band and another with a narrow guard band. The two requirements have different EVM requirements, and do not account for beamforming and spatial differentiation between numerologies. An example is illustrated in FIG. 19.

Figure 19:
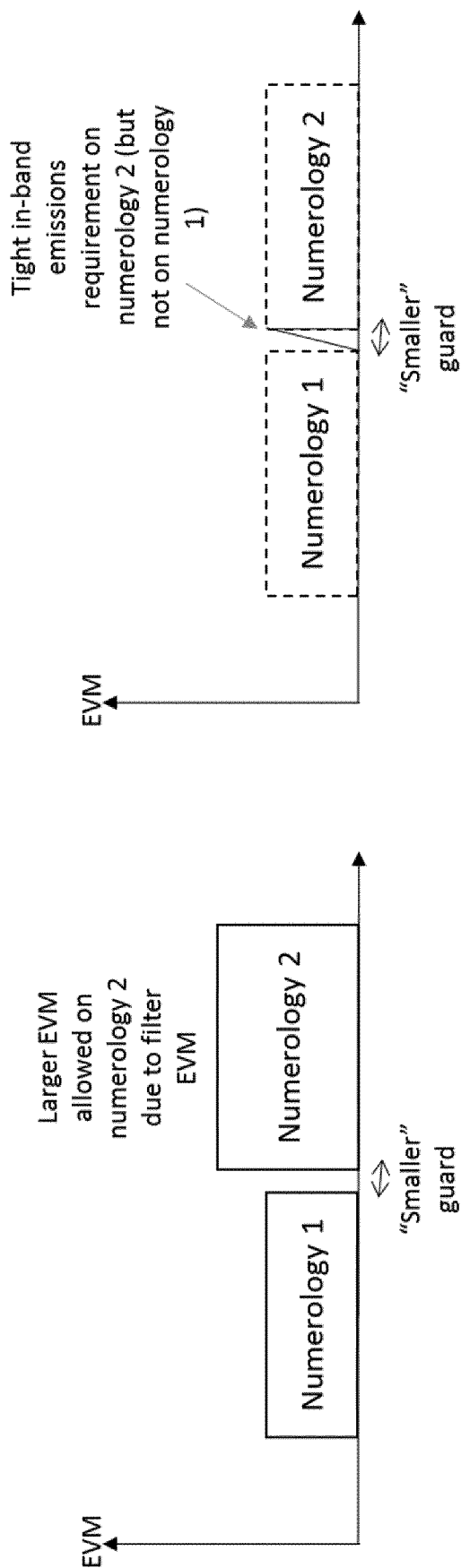
FIG. 19 illustrates two examples of numerologies with a relatively small guard band.

FIG. 19 illustrates two examples of numerologies with a relatively small guard band. With this approach, two requirements are defined; one assuming a larger guard band and the other assuming a smaller guard band. As in the previous approach, the goal is not to restrict the gNB implementation with respect to guard band allocation, but rather to set some minimum requirements.

Because different approaches may be used for managing interference between numerologies, different solutions may be needed to specify the EVM/in-band emissions for the requirement with the small guard band. In particular, for in-band emissions, setting a requirement may lead to a situation in which a gNB is forced to implement a sharp filtering, while an alternative filtering strategy as outlined in the first approach could be suitable.

Moreover, in some examples, the requirement with the narrow guard band may be a mandatory requirement or not, because some implementations may not use a narrow guard band together with strict EVM or in-band emissions as described above.

A third approach also sets two requirements. One requirement assuming large guard band and another with a narrow guard band. The two requirements assume a spatial separation between the receivers of the two numerologies. An example is illustrated in FIG. 20.

Figure 20:
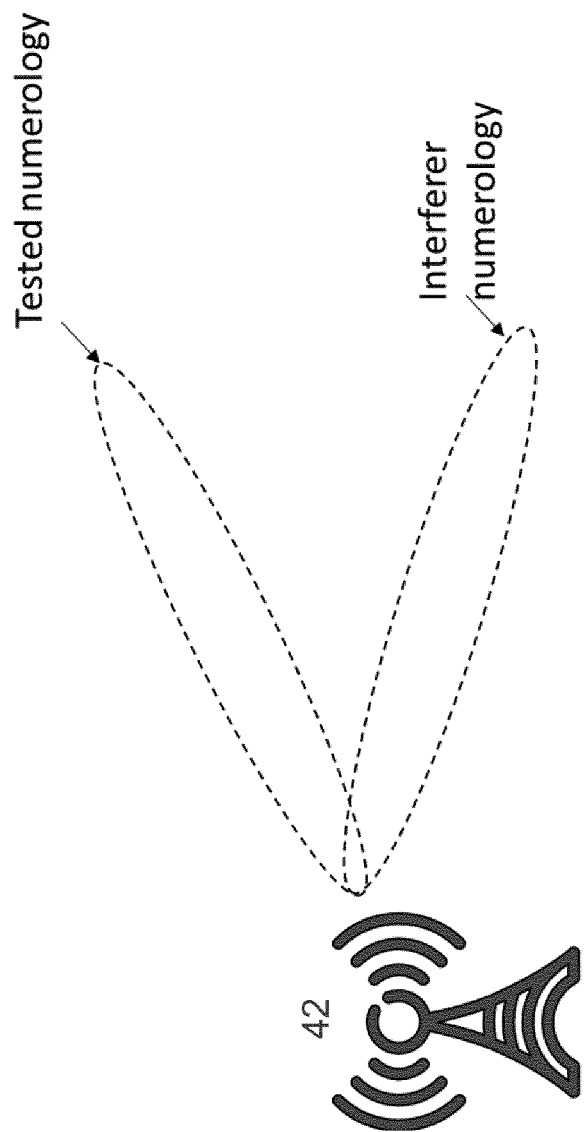
FIG. 20 illustrates an example multi-numerology network with spatially separated receivers.

FIG. 20 illustrates an example multi-numerology network with spatially separated receivers. With this approach, a gNB that performs beamforming can use spatial filtering to separate interference from the numerologies. The approach may require over the air testing. For a gNB that does not perform beamforming, similar considerations as for the second approach as to whether the requirement that assumes a narrow guard should be mandatory or not.

From the UE perspective, the receive selectivity requirement is not able to know whether the gNB does beamforming or not. For mm wave, beamforming is obvious, but for below 6 GHz it is less so. An example requirement may consider whether the UE requirement assumes worst case.

A fourth approach sets a requirement assuming a narrow or no guard band and no spatial differentiation. An example is illustrated in FIG. 21.

Figure 21:
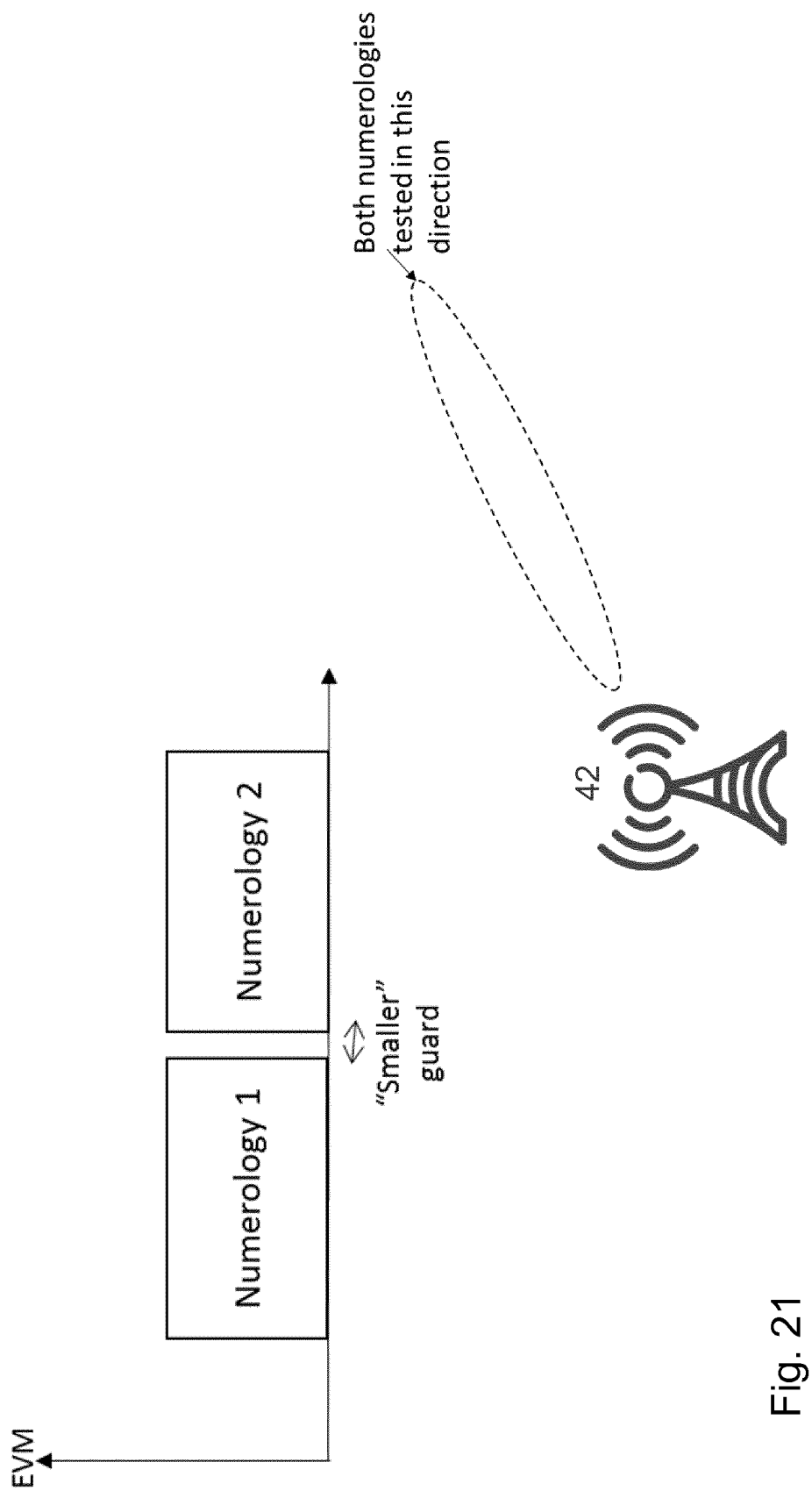
FIG. 21 illustrates an example multi-numerology network with a small guard band and receivers located in the same direction.

FIG. 21 illustrates an example multi-numerology network with a small guard band and receivers located such that the numerologies are received from the same direction. For this approach to enable different approaches to filtering/gNB guard selection the EVM and (if applicable) in band emissions requirements may be set assuming a low amount of filtering/windowing and some interference between numerologies.

The requirement represents a minimum requirement that might be exceeded by means of using a larger guard band or more filtering. A problem is that it is difficult to know whether to use filtering at the base station or UE without knowledge of what the other side of the link is doing.

A fifth approach includes no base station requirements and one or more UE selectivity requirements (potentially to allow for different implementations).

This option leaves full implementation flexibility for the base station. However, to make use of this flexibility the base station needs to know something about the UE selectivity characteristics.

Apart from these approaches, other approaches may be possible; these approaches are illustrated for the purpose of discussion. Some motivations behind some possible approaches are as follows.

Approach 1 enables a base station vendor to choose the optimal approach between reducing EVM, reducing interference and reducing the guard band. If the vendor chooses to reduce the guard band, then performance is above the minimum but not guaranteed by either the transmit or receive requirements.

Approach 2, if the second requirement is optional, gives a similar flexibility to option 1, but can provide a minimum performance for each kind of implementation. A problem is that the transmitter and receiver implementations may not match, in which end to end performance is not guaranteed.

Approach 3 facilitates a base station that performs beamforming to use spatial differentiation to achieve the requirement. However, it does not provide a minimum performance when transmitting to two numerologies in the same direction.

Approach 4 facilitates a base station that does not need to perform beamforming. However, it may result in some interference when transmitting to two numerologies in the same direction.

Approach 5 provides full flexibility to the base station, however does not impose a minimum performance on the base station (apart from the minimum performance imposed by the single numerology EVM). Again, the receiver performance may not match with the transmitter approach.

Another consideration is how the filtering approaches function if numerologies are rapidly varied due to scheduling because of the need to change filters and filter buffers.

The purpose of the examples above is to outline reasons why the approach to deciding on the amount of guard tones, and the filtering/windowing approach needs to leave implementation freedom at the base station. For different scenarios, different strategies may be appropriate and setting requirements in a clumsy manner may restrict the ability to adopt some of the strategies.

For the UE selectivity requirement, some freedom may also be used to allow for different UE approaches. Some additional example approaches include: (a) using one minimum requirement that may be exceeded (but possibly lead to unpredictable UE response); (b) using multiple requirements, some of which may be optional; (c) using several requirements and signaling which requirement the UE complies with; and (d) account for spatial differentiation between numerologies.

The following list provides non-limiting examples of how certain aspects of the proposed solutions could be implemented. The examples are merely intended to illustrate how certain aspects of the proposed solutions could be implemented, however, the proposed solutions could also be implemented in other suitable manners. Examples include:

Examples of a Transmitter:

A) A method in a wireless transmitter of transmitting a wireless signal according to a first numerology in a wireless network capable of supporting the first numerology and a second numerology, the method comprising:

receiving one or more requirements for the transmitter to meet when transmitting the wireless signal according to the first numerology, the one or more requirements based on the first numerology and the second numerology;

adapting at least one of the number of physical resource blocks (PRBs), beamforming and physical filter used to transmit the wireless signal based on the received requirements; and transmitting the wireless signal according to the first numerology.

B) The method of example A), wherein the received one or more requirements comprise at least one of the following:

a requirement that only a small amount of subcarriers/PRB are not utilized between the numerologies, that both numerologies are transmitted in the same direction, and that the EVM on both numerologies must be low;

a requirement that only a small amount of subcarriers/PRB are not utilized between the numerologies, that both numerologies are transmitted in the same direction, and that the EVM on the first numerology must be low, while the EVM on the second numerology may be higher;

a requirement that a larger amount of subcarriers/PRB are not utilized between the numerologies, that both numerologies are transmitted in the same direction, and that the EVM on both numerologies must be low;

a requirement that only a small amount of subcarriers/PRB are not utilized between the numerologies, that both numerologies are transmitted in the same direction and that the EVM on both numerologies may be high;

a requirement that only a small amount of subcarriers/PRB are not utilized between the numerologies, that both numerologies are transmitted in the same direction, and that the in-band emissions from both numerologies must be low;

a requirement that only a small amount of subcarriers/PRB are not utilized between the numerologies, that both numerologies are transmitted in the same direction, and that the in-band emissions from the first numerology must be low, while the in-band emissions from the second numerology may be higher;

a requirement that a larger amount of subcarriers/PRB are not utilized between the numerologies, that both numerologies are transmitted in the same direction, and that the in-band emissions on both numerologies in the direction of the other numerology must be low; and a requirement that only a small amount of subcarriers/PRB are not utilized between the numerologies, that both numerologies are transmitted in the same direction, and that the in-band emissions on both numerologies may be high.

C) A wireless transmitter comprising processing circuitry, the processing circuitry operable to perform the steps of any of examples A) or B).

D) The wireless transmitter of example C), wherein the wireless transmitter is one of a wireless device or a network node.

Examples of a Receiver:

E) A method in a wireless receiver of receiving a wireless signal according to a first numerology in a wireless network capable of supporting the first numerology and a second numerology, the method comprising:

receiving one or more requirements for the transmitter to meet when transmitting the wireless signal according to the first numerology, the one or more requirements based on the first numerology and the second numerology;

adapting at least one of the number of physical resource blocks (PRBs), beamforming and physical filter used to transmit the wireless signal based on the received requirements; and transmitting the wireless signal according to the first numerology.

F) The method of example E), wherein the received one or more requirements comprise at least one of the following:

a requirement that only a small amount of subcarriers/PRB are not utilized between the numerologies, that both numerologies are transmitted in the same direction, and that the EVM on both numerologies must be low;

a requirement that only a small amount of subcarriers/PRB are not utilized between the numerologies, that both numerologies are received from the same direction, and that the EVM on the first numerology must be low (and/or demodulation data rate high), while the EVM on the second numerology can be higher (and/or demodulation data rate lower);

a requirement that a larger amount of subcarriers/PRB are not utilized between the numerologies, that both numerologies are received from the same direction, and that the EVM on both numerologies must be low (and/or demodulation data rate on the numerologies high); a requirement that only a small amount of subcarriers/PRB are not utilized between the numerologies, that both numerologies are received from the same direction, and that the EVM on both numerologies may be high (or demodulation data rate low);

a requirement that only a small amount of subcarriers/PRB are not utilized between the numerologies, and that both numerologies are received from the same direction, and that the receiver can receive one numerology correctly in the presence of interference or blocking signals from the other numerology;

a requirement that a larger amount of subcarriers/PRB are not utilized between the numerologies, and that both numerologies are received from the same direction, and that the receiver can receive one numerology correctly in the presence of interference or blocking signals from the other numerology; and a requirement that only a small amount of subcarriers/PRB are not utilized between the numerologies, and that both numerologies are received from different directions, and that the receiver can receive one numerology correctly in the presence of interference or blocking signals from the other numerology.

G) A wireless receiver comprising processing circuitry, the processing circuitry operable to perform the steps of any of examples E) or F).

H) The wireless receiver of example G), wherein the wireless receiver is one of a wireless device or a network node.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BLER Block Error Rate
BS Base Station
BTS Base Transceiver Station
D2D Device to Device
DL Downlink
eNB eNodeB
EVM Error Vector Magnitude
FFT Fast Fourier Transform
GHz Giga Hertz
kHz Kilo Hertz
LTE Long Term Evolution
M2M Machine to Machine
MBB Mobile Broadband
MIMO Multi-Input Multi-Output
MTC Machine Type Communication
NR New Radio
OFDM Orthogonal Frequency Division Multiplex
PRB Physical Resource Block
RAN Radio Access Network
RAT Radio Access Technology
RB Resource Block
RNC Radio Network Controller
RRC Radio Resource Control
RRH Remote Radio Head
RRU Remote Radio Unit
RX Receive
SINR Signal to Interference and Noise Ratio
TDD Time Division Duplex
TX Transmit
UE User Equipment
UL Uplink
URLLC Ultra Reliable Low Latency Communication
μs Micro Seconds UTRAN Universal Terrestrial Radio Access Network
V2V Vehicle to Vehicle
V2X Vehicle to Infrastructure
WAN Wireless Access Network

The invention claimed is:

1. A method in a wireless transmitter of transmitting a first wireless signal according to a first numerology in a wireless network supporting both the first numerology and a second numerology, wherein a numerology refers to a particular combination of subcarrier spacing and cyclic prefix length, the method comprising:
obtaining one or more requirements associated with each numerology, wherein the one or more requirements comprises at least one of an indication that a number of unused subcarriers between the first numerology and the second numerology is above or below a threshold number of subcarriers, an indication that an interference level for the first numerology is above or below a threshold interference level, and an indication that an interference level for the second numerology is above or below the threshold interference level;
adapting at least one of a first filter property of the wireless transmitter, a first beamforming property of the wireless transmitter, and a guard band size between the first numerology and the second numerology, based on the obtained one or more requirements; and
transmitting the first wireless signal according to the first numerology.

2. A wireless transmitter configured to transmit a first wireless signal according to a first numerology in a wireless network that supports both the first numerology and a second numerology, wherein a numerology refers to a particular combination of subcarrier spacing and cyclic prefix length, the wireless transmitter comprising processing circuitry configured to:
obtain one or more requirements associated with each numerology, wherein the one or more requirements comprises at least one of an indication that a number of unused subcarriers between the first numerology and the second numerology is above or below a threshold number of subcarriers, an indication that an interference level for the first numerology is above or below a threshold interference level, and an indication that an interference level for the second numerology is above or below the threshold interference level;
adapt at least one of a first filter property of the wireless transmitter, a first beamforming property of the wireless transmitter, and a guard band size between the first numerology and the second numerology, based on the obtained one or more requirements.

3. The wireless transmitter of claim 2, wherein the one or more requirements comprises an indication corresponding to a level of interference between a transmission using the first numerology and a transmission using the second numerology.

4. The wireless transmitter of claim 2, the processing circuitry further configured to:
adapt at least one of a second filter property of the wireless transmitter and a second beamforming property of the wireless transmitter based on the obtained one or more requirements; and
transmit a second wireless signal according to the second numerology.

5. The wireless transmitter of claim 2, wherein the one or more requirements comprises an indication that the number of unused subcarriers between the first numerology and the second numerology is below the threshold number of carriers, an indication that the first numerology and the second numerology are transmitted in the same direction, an indication that the interference level for the first numerology is below the threshold interference level, and an indication that the second numerology is below the threshold interference level.

6. The wireless transmitter of claim 2, wherein the one or more requirements comprises an indication that the number of unused subcarriers between the first numerology and the second numerology is below the threshold number of carriers, an indication that the first numerology and the second numerology are transmitted in the same direction, an indication that the interference level for the first numerology is below the threshold interference level, and an indication that the second numerology is above the threshold interference level.

7. The wireless transmitter of claim 2, wherein the one or more requirements comprises an indication that the number of unused subcarriers between the first numerology and the second numerology is above the threshold number of carriers, an indication that the first numerology and the second numerology are transmitted in the same direction, an indication that the interference level for the first numerology is below the threshold interference level, and an indication that the second numerology is below the threshold interference level.

8. The wireless transmitter of claim 2, wherein the one or more requirements comprises an indication that the number of unused subcarriers between the first numerology and the second numerology is below the threshold number of carriers, an indication that the first numerology and the second numerology are transmitted in the same direction, an indication that the interference level for the first numerology is above the threshold interference level, and an indication that the second numerology is above the threshold interference level.

9. The wireless transmitter of claim 2, wherein the interference level is an error vector magnitude (EVM) level and the threshold interference level refers to a threshold EVM level.

10. The wireless transmitter of claim 2, wherein the interference level is an in-band emissions level and the threshold interference level refers to a threshold in-band emissions level.

11. The wireless transmitter of claim 2, wherein the one or more requirements is based on a size of a guard band between the first numerology and the second numerology.

12. The wireless transmitter of claim 2, wherein the processing circuitry is operable to obtain the one or more requirements by receiving the indication from a scheduler or by receiving a preconfiguration based on a specification in a standard, product requirement, or test result.

13. The wireless transmitter of claim 2, wherein the wireless transmitter comprises one of a user equipment and a network node.

14. A method in a wireless receiver of receiving a first wireless signal according to a first numerology in a wireless network supporting both the first numerology and a second numerology, wherein a numerology refers to a particular combination of subcarrier spacing and cyclic prefix length, the method comprising:
obtaining one or more requirements associated with each numerology, wherein the one or more requirements comprises at least one of an indication that a number of unused subcarriers between the first numerology and the second numerology is above or below a threshold number of subcarriers, an indication that an interference level for the first numerology is above or below a threshold interference level, and an indication that an interference level for the second numerology is above or below the threshold interference level;

adapting at least one of a first filter property of the wireless receiver, a first beamforming property of the wireless receiver, and a guard band size between the first numerology and the second numerology, based on the obtained one or more requirements; and receiving the first wireless signal according to the first numerology.

15. A wireless receiver configured to receive a first wireless signal according to a first numerology in a wireless network supporting both the first numerology and a second numerology, wherein a numerology refers to a particular combination of subcarrier spacing and cyclic prefix length, the wireless receiver comprising processing circuitry operable to:

obtain one or more requirements associated with each numerology, wherein the one or more requirements comprises at least one of an indication that a number of unused subcarriers between the first numerology and the second numerology is above or below a threshold number of subcarriers, an indication that an interference level for the first numerology is above or below a threshold interference level, and an indication that an interference level for the second numerology is above or below the threshold interference level;

adapt at least one of a first filter property of the wireless receiver, a first beamforming property of the wireless receiver, and a guard band size between the first numerology and the second numerology, based on the obtained one or more requirements; and receive the first wireless signal according to the first numerology.

16. The wireless receiver of claim 15, wherein the one or more requirements comprises an indication of a level of interference between a transmission using the first numerology and a transmission using the second numerology.

17. The wireless receiver of claim 15, the processing circuitry further configured to:

adapt at least one of a second filter property of the wireless receiver and a second beamforming property of the wireless receiver; and receive a second wireless signal according to the second numerology.

18. The wireless receiver of claim 15, wherein the one or more requirements comprises an indication that the number of unused subcarriers between the first numerology and the second numerology is below the threshold number of carriers, an indication that the first numerology and the second numerology are received from the same direction, an indication that the interference level for the first numerology is below the threshold interference level, and an indication that the second numerology is below the threshold interference level.

19. The wireless receiver of claim 15, wherein the one or more requirements comprises an indication that the number of unused subcarriers between the first numerology and the second numerology is below the threshold number of carriers, an indication that the first numerology and the second numerology are received from the same direction, an indication that the interference level for the first numerology is below the threshold interference level, and an indication that the second numerology is above the threshold interference level.

20. The wireless receiver of claim 15, wherein the one or more requirements comprises an indication that the number of unused subcarriers between the first numerology and the second numerology is above the threshold number of carriers, an indication that the first numerology and the second numerology are received from the same direction, an indication that the interference level for the first numerology is below the threshold interference level, and an indication that the second numerology is below the threshold interference level.

21. The wireless receiver of claim 15, wherein the one or more requirements comprises an indication that the number of unused subcarriers between the first numerology and the second numerology is below the threshold number of carriers, an indication that the first numerology and the second numerology are received from the same direction, an indication that the interference level for the first numerology is above the threshold interference level, and an indication that the second numerology is above the threshold interference level.

22. The wireless receiver of claim 15, wherein the interference level is an error vector magnitude (EVM) level and the threshold interference level refers to a threshold EVM level.

23. The wireless receiver of claim 15, wherein the interference level is a selectivity level and the threshold interference level refers to a threshold selectivity level.

24. The wireless receiver of claim 15, wherein the one or more requirements of the minimum acceptable interference level is based on a size of a guard band between the first numerology and the second numerology.

25. The wireless receiver of claim 15, wherein the processing circuitry is operable to obtain the one or more requirements by receiving the one or more requirements from a scheduler or by receiving a preconfiguration based on a specification in a standard, product requirement, or test result.

26. The wireless receiver of claim 15, wherein the wireless receiver comprises one of a user equipment and a network node.

* * * * *